(12) United States Patent
Yamaguchi et al.

(10) Patent No.: US 8,326,032 B2
(45) Date of Patent: Dec. 4, 2012

(54) IMAGE PROCESSING APPARATUS, IMAGE PROCESSING METHOD, AND COMPUTER PROGRAM PRODUCT

(75) Inventors: Arata Yamaguchi, Tokyo (JP); Hiroaki Sagae, Tokyo (JP); Takashi Kimura, Kanagawa (JP); Masakazu Yoshida, Kanagawa (JP); Shigetaka Sakakibara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 368 days.

(21) Appl. No.: 12/760,157

(22) Filed: Apr. 14, 2010

(65) Prior Publication Data

US 2010/0265548 A1    Oct. 21, 2010

(30) Foreign Application Priority Data

Apr. 15, 2009   (JP) .................................. 2009-099180

(51) Int. Cl.
G06K 9/00 (2006.01)
(52) U.S. Cl. .......................... 382/166; 382/162; 382/167
(58) Field of Classification Search .................. 382/128, 382/162, 166, 167, 251, 252; 345/616, 690; 358/1.15, 3.03, 406, 442
See application file for complete search history.

(56) References Cited

U.S. PATENT DOCUMENTS 7,203,376 B2 *   4/2007   Takahashi et al. ............. 382/252
7,420,700 B2 *   9/2008   Hayashi ....................... 358/1.15

FOREIGN PATENT DOCUMENTS

| JP | 7-58953 | 3/1995 |
|---|---|---|
| JP | 8-18781 | 1/1996 |
| JP | 3399341 | 2/2003 |
| JP | 2004-236249 | 8/2004 |
| JP | 2004-328266 | 11/2004 |
| JP | 2005-136975 | 5/2005 |
| JP | 2005-277766 | 10/2005 |
| JP | 3730057 | 10/2005 |
| JP | 3732470 | 10/2005 |
| JP | 2005-354231 | 12/2005 |
| JP | 2006-41814 | 2/2006 |

(Continued)

OTHER PUBLICATIONS

Robert Floyd, et al., "An Adaptive Algorithm for Spatial Grey Scale," SID International Symposium, Digest of Technical Papers, vol. 4.3, Apr. 1975, 4 pages.

*Primary Examiner* — Anh Hong Do
(74) *Attorney, Agent, or Firm* — Oblon, Spivak, McClelland, Maier & Neustadt, L.L.P.

(57) ABSTRACT

An image processing apparatus, which performs an error diffusion on M-value image data with an error weight matrix into N-value image data, includes: a corrected-value calculating unit that calculates a corrected value by adding a first value and a second value to a pixel value corresponding to a processing-target color component of a pixel of interest, the first value being obtained by multiplying an error for each quantized pixel of the processing-target color component by the matrix, and the second value being obtained by multiplying an error for each quantized pixel of a different color component by the matrix; a quantizing unit that compares the corrected value with a quantization threshold, and outputs N-value image data; and an error diffusion unit that calculates an error at the pixel of interest by subtracting a quantization threshold from a value obtained by adding the first value to the pixel value.

13 Claims, 21 Drawing Sheets

FOREIGN PATENT DOCUMENTS

| | | |
|---|---|---|
| JP | 3774127 | 2/2006 |
| JP | 2006-129100 | 5/2006 |
| JP | 2006-262196 | 9/2006 |
| JP | 2006-279296 | 10/2006 |
| JP | 2006-295318 | 10/2006 |
| JP | 2007-36895 | 2/2007 |
| JP | 2007-288277 | 11/2007 |
| JP | 4047119 | 11/2007 |
| JP | 4251492 | 1/2009 |
| JP | 4257087 | 2/2009 |

* cited by examiner

FIG. 10

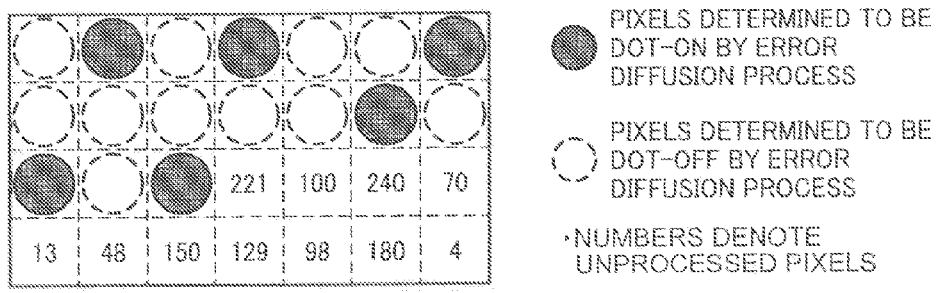

● PIXELS DETERMINED TO BE DOT-ON BY ERROR DIFFUSION PROCESS

○ PIXELS DETERMINED TO BE DOT-OFF BY ERROR DIFFUSION PROCESS

·NUMBERS DENOTE UNPROCESSED PIXELS $e_{xy}$ : ERROR CAUSED BY THRESHOLD PROCESSING

* : NEXT ERROR-DIFFUSION-PROCESS TARGET PIXEL

⇩

CALCULATE CORRECTED PIXEL VALUE BY MULTIPLYING ERROR VALUES OF PROCESSED NEIGHBORING PIXELS BY FOLLOWING WEIGHTS, RESPECTIVELY, AND ADDING THEM TO VALUE OF NEXT PROCESS TARGET PIXEL.

ERROR WEIGHT MATRIX $\frac{1}{48}$ ×

| 1 | 3 | 5 | 3 | 1 |
|---|---|---|---|---|
| 3 | 5 | 7 | 5 | 3 |
| 5 | 7 |  |   |   |

* : NEXT ERROR-DIFFUSION-PROCESS TARGET PIXEL POSITION

CORRECTED PIXEL VALUE = $221 + \frac{1}{48}e_{10} + \frac{3}{48}e_{20} + \frac{5}{48}e_{30} + \cdots + \frac{7}{48}e_{13}$

⇩

COMPARE FIXED (VARIABLE) THRESHOLD WITH CORRECTED PIXEL VALUE, AND CALCULATE DOT-OFF/DOT-ON AND ERROR VALUE ($e_{xy}$) (WHEN 255=SOLID, 0=PLAIN)

IF CORRECTED PIXEL VALUE > THRESHOLD
        $e_{xy}$=CORRECTED PIXEL VALUE−255 ···DOT-ON

ELSE
        $e_{xy}$=CORRECTED PIXEL VALUE ···DOT-OFF

FIG. 15A

| 1 | 3 | 5 | 3 | 1 |
|---|---|---|---|---|
| 3 | 5 | 7 | 5 | 3 |
| 5 | 7 | * |   |   |

\*: POSITION OF PIXEL OF INTEREST

CONVENTIONAL ERROR DIFFUSION MATRIX

ERROR AT POSITION OF PIXEL OF INTEREST IS CALCULATED BASED ON NEIGHBORING ERRORS IN OWN PLATE, SO THAT PIXEL OF INTEREST IS EXCLUDED FROM MATRIX

FIG. 15B

| 1 | 3 | 5  | 3 | 1 |
|---|---|----|---|---|
| 3 | 5 | 7  | 5 | 3 |
| 5 | 7 | 16 |   |   |

OTHER PLATE ERROR MATRIX

ERROR OF PIXEL OF INTEREST (BOLD FACE) IN OWN PLATE IS CALCULATED BASED ON NEIGHBORING ERRORS IN HIGHER-PRIORITY COLOR PLATE OTHER THAN OWN PLATE, SO THAT PIXEL OF INTEREST IS INCLUDED IN MATRIX

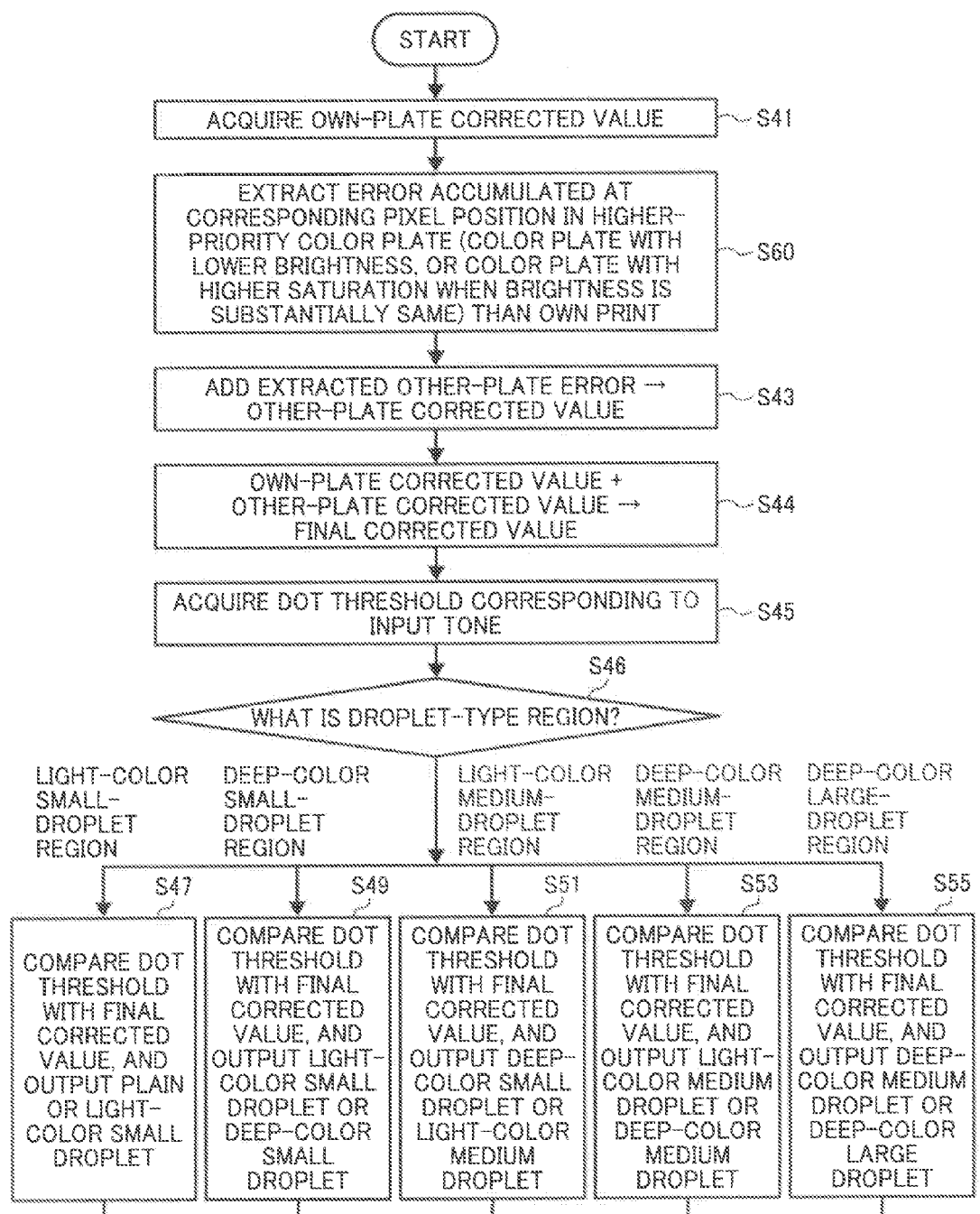

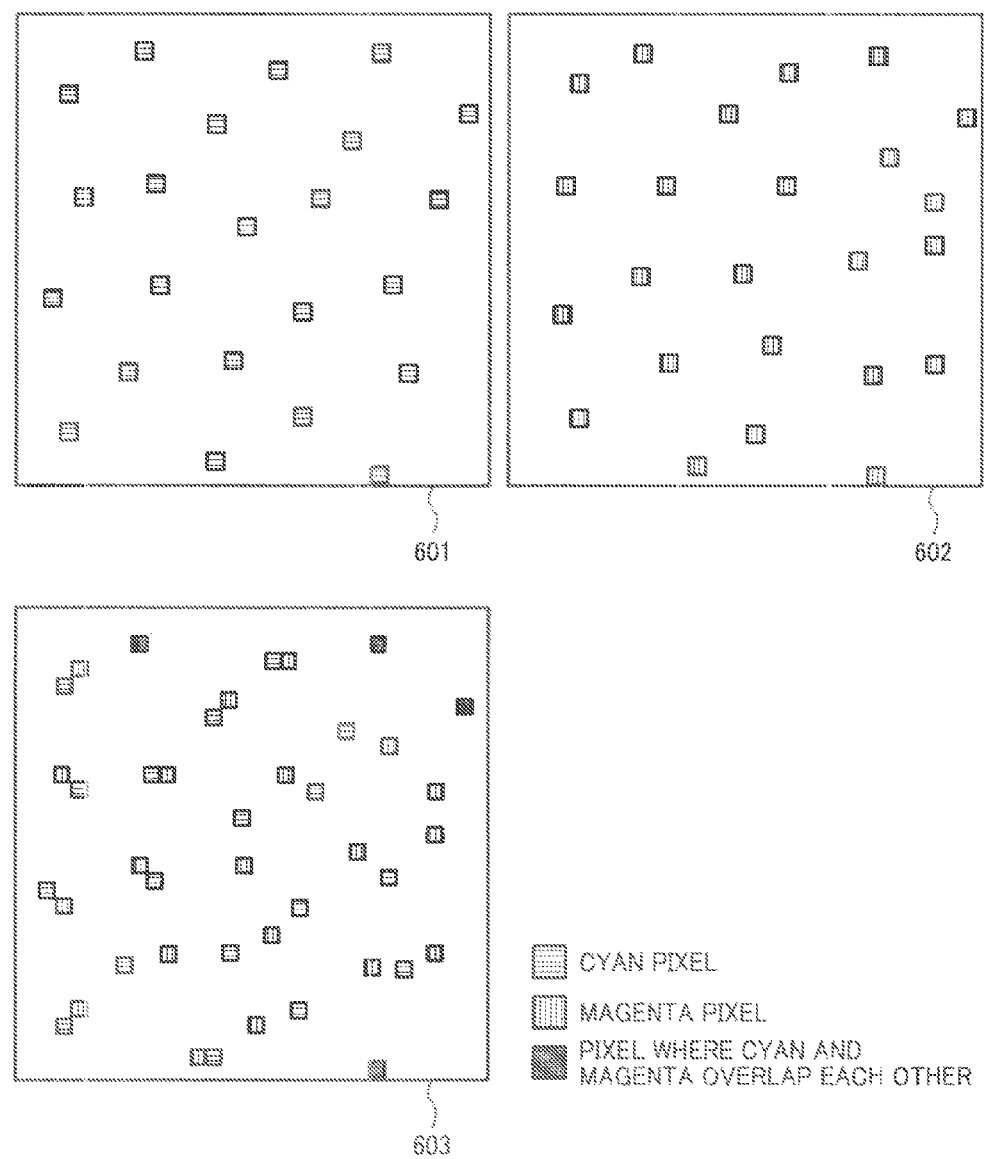

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-099180 filed in Japan on Apr. 15, 2009. The present document incorporates by reference the entire contents of Japanese application No. 2008-236353 filed in Japan on Sep. 16, 2008.

BACKGROUND OF THE INVENTION

1. Field of the Invention

The present invention relates to an image processing apparatus, an image processing method, and a computer-program product. In particular, the present invention relates to an image processing apparatus, an image processing method, and a computer-program product that can achieve optimum distribution of a dot array in whole color plates for a multi-valued image data containing at least two types of color components, and can prevent color overlay in each color plate.

2. Description of the Related Art

An inkjet recording system has attracted attention as a system for office use, because it can achieve high-speed recording with no need of special fixing processes on so-called plain papers while it can suppress noise caused by the recording to a negligible level. Conventionally, various systems have been proposed, and products thereof have been manufactured and put into practical use. In the inkjet recording system, an inkjet head formed of an ink chamber and a nozzle, communicated with the ink chamber, is used to form images in such a manner that pressure is applied to ink in the ink chamber depending on image information so as to cause ink small dots to be sprayed from out of the nozzle and attached to a recording medium such as a paper or a film. There are serial inkjet printers and line inkjet printers classified according to their head structures. In the serial inkjet printers, an image is formed by scanning a paper with an inkjet head in a paper-width direction (main scanning), and when the scanning is completed one or more times, the paper is conveyed to form a next recording line. On the other hand, in the line inkjet printers, nozzles are formed so as to cover almost the whole area in the paper-width direction, and recording is performed while a paper is being conveyed without scanning motion in the width direction. The latter has advantages in that recording speed is high because one line in the width direction can be formed at one time, but has disadvantages in that a size of the printer increases because a size of the head itself increases, and a manufacturing cost for the head increases because the nozzles need to be arrayed at high density to achieve recording at high resolution. In contrast, the former has advantages in that a cost for the apparatus is low because a relatively small head is used to form images. Therefore, a large number of serial inkjet printers have been put to practical use.

Regarding colors of recording materials used for forming output images in conventional inkjet recording apparatuses, four colors are generally used, which are cyan (C), magenta (M), yellow (Y) being three primary colors employed in subtractive color mixing, and added with black (K). In this operation, images are formed by using recording materials of respective colors after a pseudo halftone process is performed, in which three color components of red (R), green (G), blue (B) of input image data are converted into three colors of C, M, Y or four colors of C, M, Y, K, and the multi-valued image data is converted into binary image data.

As a means for converting multi-valued image data into binary image data, an error diffusion method proposed by R. Floyd et al. is known (see, for example, "An adaptive algorithm for spatial gray scale", SID International Symposium Digest of Technical Papers, vol. 4.3, 1975, pp. 36 to 37). The error diffusion method is implemented to realize pseudo tone expression by diffusing a quantized error generated at a certain pixel to a plurality of successive pixels. When the pseudo halftone process is performed on multi-valued image data for CMYK four colors, a process is separately performed for each color by using the above-mentioned error diffusion method or the like. In this operation, a binary image generated for each color has excellent visual quality. However, a color binary image in which two or more colors are composited does not always have good visual quality.

FIG. 24 is a diagram illustrating a binary image containing a cyan pixel group, a binary image containing a magenta pixel group, and a binary image in which these images are composited. In the figure, 601 denotes a cyan binary image, 602 denotes a magenta binary image, and 603 denotes a composite image of the cyan binary image 601 and the magenta binary image 602. Each binary image for cyan and magenta is generated by applying the error diffusion method to image data having homogeneous pixel values. We can see each pixel is formed at constant intervals and with good visual quality. On the other hand, in the binary image 603 in which two colors are composited, because positions of cyan pixels and positions of magenta pixels are not correlated, intervals between positions where pixels for respective colors are formed are not uniform. Furthermore, even though the area contains a small number of pixels, some pixels are formed of two colors overlapping each other. As a result, the binary image can be far from having good visual quality.

To overcome the above-mentioned disadvantages, Japanese Patent Application Laid-open No. 2005-136975 discloses a technology performing a halftone process by adding an error caused by quantization to other color components per pixel, and then performing a subtraction process on a color component other than the added color components by centering around the processed pixel position.

However, in the technology disclosed in Japanese Patent Application Laid-open No. 2005-136975, the process is performed per pixel and neighboring errors are not considered. Therefore, although overlapping of dots for different color components can be prevented for each pixel, dot array for the whole image can not optimally be determined.

SUMMARY OF THE INVENTION

It is an object of the present invention to at least partially solve the problems in the conventional technology.

According to an aspect of the present invention, there is provided an image processing apparatus that performs an error diffusion process on M-value image data by using a predetermined error weight matrix to quantize the M-value image data into N-value image data (M>N>1) for each predetermined color component, the image processing apparatus including: a corrected-value calculating unit that calculates a corrected value by adding a first value and a second value to a pixel value corresponding to a processing-target color component of a pixel of interest of the M-value image data, the first value being obtained by multiplying an error for each quantized pixel of the processing-target color component by the error weight matrix, and the second value being obtained by multiplying an error for each quantized pixel of a different color component from the processing-target color component by the error weight matrix; a quantizing unit that compares the corrected value with a quantization threshold corresponding to the N-value image data, and outputs N-value image data of the processing-target color component; and an error diffusion unit that calculates, as an error at the pixel of interest, a value by subtracting a quantization threshold corresponding to the output N-value image data from a value which is obtained by adding the first value to the pixel value corresponding to the processing-target color component of the pixel of interest.

According to another aspect of the present invention, there is provided an image processing method for an image processing apparatus to perform an error diffusion process on M-value image data by using a predetermined error weight matrix to quantize the M-value image data into N-value image data (M>N>1) for each predetermined color component, the image processing method including: calculating a corrected value by adding a first value and a second value to a pixel value corresponding to a processing-target color component of a pixel of interest of the M-value image data, the first value being obtained by multiplying an error for each quantized pixel of the processing-target color component by the error weight matrix, and the second value being obtained by multiplying an error for each quantized pixel of a different color component from the processing-target color component by the error weight matrix; quantizing the processing-target color component by comparing the corrected value with a quantization threshold corresponding to the N-value image data, and outputting N-value image data of the processing-target color component; and error-diffusing by calculating, as an error at the pixel of interest, a value by subtracting a quantization threshold corresponding to the output N-value image data from a value which is obtained by adding the first value to the pixel value corresponding to the processing-target color component of the pixel of interest.

According to still another aspect of the present invention, there is provided a computer program product including a computer usable medium having computer readable program codes embodied in the medium for an image processing apparatus to perform an error diffusion process on M-value image data by using a predetermined error weight matrix to quantize the M-value image data into N-value image data (M>N>1) for each predetermined color component, the program codes when executed causing a computer to execute: calculating a corrected value by adding a first value and a second value to a pixel value corresponding to a processing-target color component of a pixel of interest of the M-value image data, the first value being obtained by multiplying an error for each quantized pixel of the processing-target color component in the error weight matrix by a value of each pixel in the error weight matrix, and the second value being obtained by multiplying an error for each quantized pixel of a different color component from the processing-target color component in the error weight matrix by a value of each pixel in the weight matrix; comparing the corrected value with a quantization threshold corresponding to the N-value image data to thereby output N-value image data of the processing-target color component; and calculating, as an error at a pixel of interest, a value by subtracting a quantization threshold corresponding to the output N-value image data from a value which is obtained by adding a pixel value of the processing-target color component and the error weight matrix to a pixel value corresponding to the processing-target color component of the pixel of interest.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is an explanatory diagram for explaining a halftone process by the error diffusion method;

FIGS. 15A and 15B are diagrams illustrating examples of an error diffusion matrix (threshold matrix);

FIGS. 23A and 23B are detailed flowcharts of the flowchart of FIG. 23 for explaining an error diffusion process according to a third example, which is performed by the halftone processing unit according to the second embodiment; and FIG. 24 is a diagram for explaining a conventional technology.

DETAILED DESCRIPTION OF THE PREFERRED EMBODIMENTS

Exemplary embodiments of an image forming apparatus and a host apparatus to which an image processing apparatus, an image processing method, a computer-executable program, and a computer-readable recording medium according to the present invention are applied will be explained in detail below with reference to the accompanying drawings. The present invention is not limited by the following embodiments. In addition, constituent elements in the following embodiments include those that are replaceable or easily replaced by persons skilled in the art or those substantially equivalent.

[Image Forming Apparatus and Host Apparatus]

Figure 1:
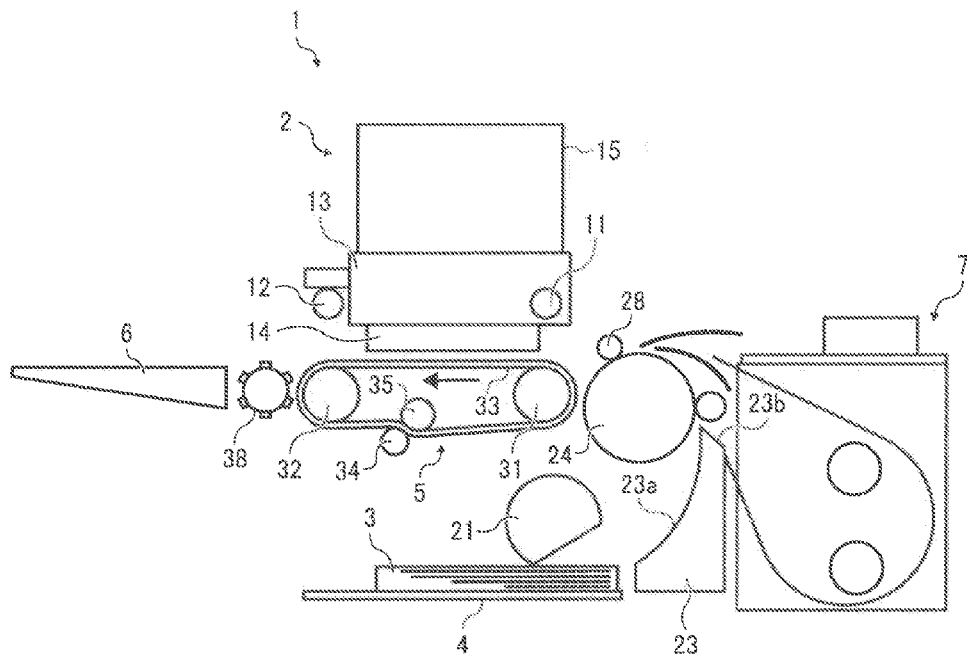
FIG. 1 is a schematic configuration diagram of a mechanism of an inkjet recording apparatus being an image forming apparatus according to an embodiment to which the present invention is applied.
Figure 2:
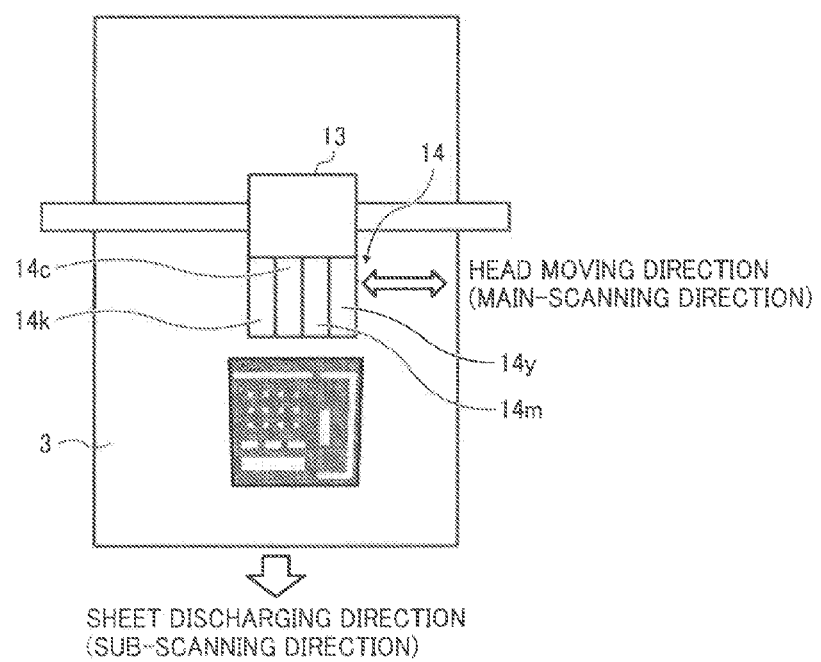
FIG. 2 is an explanatory plan view of main components of the mechanism.
Figure 3:
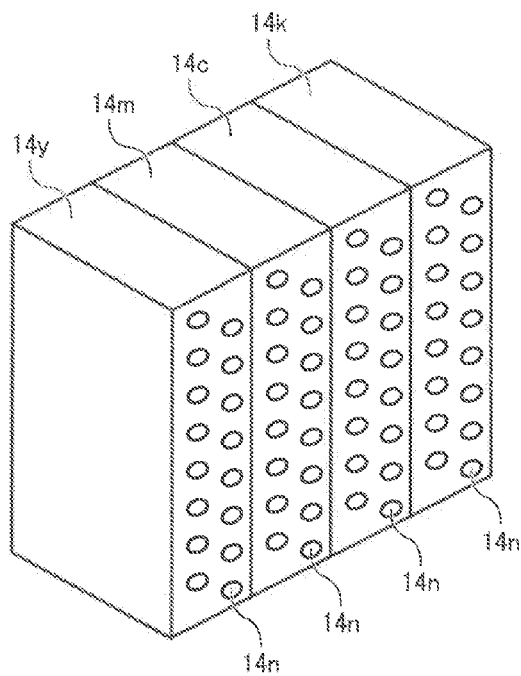
FIG. 3 is an explanatory perspective view of a head unit structure of the apparatus.
Figure 4:
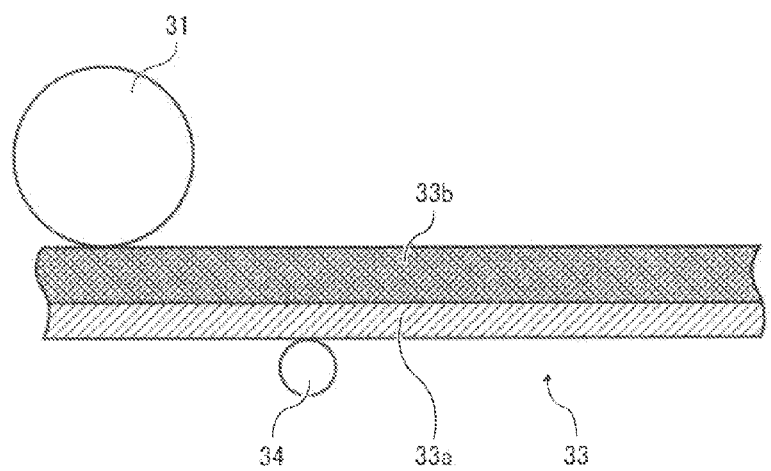
FIG. 4 is an explanatory diagram for explaining an example of a conveying belt of the apparatus.

An example of an inkjet recording apparatus as an image forming apparatus that can perform bidirectional printing and to which the present invention is applied is described below with reference to FIGS. 1 to 4. FIG. 1 is a schematic configuration diagram of a whole mechanism of the recording apparatus. FIG. 2 is an explanatory plan view of main components of the recording apparatus. FIG. 3 is an explanatory perspective view of a head structure of the recording apparatus. FIG. 4 is an explanatory schematic cross-sectional view of a conveying belt of the recording apparatus.

The inkjet recording apparatus includes an image forming unit 2 and the like inside an apparatus body 1. A feed tray 4 for stacking a plurality of recording media (hereinafter, referred to as "sheet") 3 is arranged below the apparatus body 1. The inkjet recording apparatus receives the sheet 3 fed from the feed tray 4, causes the image forming unit 2 to record a required image onto the sheet 3 while causing a conveying mechanism 5 to keep conveying the sheet 3, and discharges the sheet 3 to a discharge tray 6 attached to a side portion of the apparatus body 1.

The inkjet recording apparatus also includes a duplex unit 7 detachable from the apparatus body 1. When performing duplex printing, once printing of one surface (face) is completed, the inkjet recording apparatus delivers the sheet 3 into the duplex unit 7 by causing the conveying mechanism 5 to convey the sheet 3 in an opposite direction; inverts the sheet 3 so that other surface (back) can be handled as a printable surface; feeds the sheet 3 into the conveying mechanism 5 once again; and discharges the sheet 3 to the discharge tray 6 after printing on the other surface (back) is completed.

The image forming unit 2 is configured such that a carriage 13 is slidably mounted on guide shafts 11 and 12, and a motor not illustrated moves (main scanning) the carriage 13 in a direction perpendicular to a conveying direction of the sheet 3. The carriage 13 is equipped with a recording head 14 constituted of a droplet ejection head on which nozzle holes 14n (see FIG. 3), being a plurality of ejection ports for ejecting droplets, are arranged. An ink cartridge 15 for supplying liquid to the recording head 14 is also mounted on the carriage 13. It is possible to mount a sub tank instead of the ink cartridge 15 on the carriage 13 such that the sub tank is replenished and supplied with ink from a main tank.

As shown in FIGS. 2 and 3 for example, it is assumed that the recording head 14 is formed with four separate inkjet heads 14y, 14m, 14c, and 14k being droplet ejection heads that eject ink droplets for respective colors of yellow (Y), magenta (M), cyan (C), and black (Bk). However, it is possible to use one or more heads each having a plurality of nozzle lines for ejecting droplets for these colors. Furthermore, the number of colors and an order of arrangement are not limited to this example.

An inkjet head constituting the recording head 14 may include, as energy generating means for ejecting ink, a piezoelectric actuator such as a piezoelectric element, a thermal actuator that utilizes phase-change caused by film boiling of liquid by using an electro-thermal conversion element such as a heat resistant element, a shape-memory alloy actuator that utilizes metallic phase-change caused by temperature change, and an electrostatic actuator that utilizes electrostatic force.

The sheets 3 in the feed tray 4 are separated one by one by a feed roller (semilunar roller) 21 and a separation pad not illustrated, fed to the inside of the apparatus body 1, and delivered to the conveying mechanism 5.

The conveying mechanism 5 includes a conveying guide unit 23 that guides the fed sheet 3 to an upper side along a guide surface 23a and that guides the sheet 3 delivered from the duplex unit 7 along a guide surface 23b; a conveying roller 24 that conveys the sheet 3; a pressure roller 25 that presses the sheet 3 toward the conveying roller 24; a guide member 26 that guides the sheet 3 toward the conveying roller 24; a guide member 27 that guides the sheet 3 returned at the time of duplex printing to the duplex unit 7; and a pressing roller 28 that presses the sheet 3 delivered from the conveying roller 24.

The conveying mechanism 5 also includes, to convey the sheet 3 while maintaining the flatness of the sheet 3 by using the recording head 14, a conveying belt 33 extended between a driving roller 31 and a driven roller 32; a charging roller 34 that charges the conveying belt 33; a guide roller 35 opposing to the charging roller 34; a guide member (platen plate) (not illustrated) that guides the conveying belt 33 at a position facing the image forming unit 2; and a cleaning roller (not illustrated) made of porous body and functioning as cleaning means for removing recording liquid (ink) attached to the conveying belt 33.

The conveying belt 33 is an endless belt extended between the driving roller 31 and the driven roller (tension roller) 32, and is configured to rotate in a direction of the arrow (sheet conveying direction) shown in FIG. 1.

The conveying belt 33 may have a single-layer structure, a double-layer structure formed of a first layer (topmost layer) 33a and a second layer (back layer) 33b as shown in FIG. 4, or three or more layer structures. For example, it is assumed that the conveying belt 33 is formed of a front layer that functions as a sheet attaching surface and that is made of pure resin material, e.g., ETFE pure material, without resistance control and with a thickness of 40 μm; and a back layer (medium-resistivity layer, ground layer) that is made of the same material as that of the front layer with resistance control by carbon.

The charging roller 34 is arranged so as to come into contact with the front layer of the conveying belt 33 and rotate along with the rotation of the conveying belt 33. A high-voltage circuit (high-voltage power supply) not illustrated applies a high voltage in a predetermined pattern to the charging roller 34.

A discharging roller 38 that discharges the sheet 3 with a recorded image thereon to the discharge tray 6 is arranged on a downstream side of the conveying mechanism 5.

In the image forming apparatus configured as described above, the conveying belt 33 rotates in the direction of the arrow, and is positively charged by coming into contact with the charging roller 34 to which a high-potential voltage is being applied. In this operation, polarity of charge from the charging roller 34 is changed at predetermined time intervals so that the conveying belt 33 can be charged at a predetermined charging pitch.

When the sheet 3 is fed onto the conveying belt 33 being charged to a high potential, interior of the sheet 3 is polarized, and charges with polarity opposite to that of charges on the conveying belt 33 are induced on a contact surface between the sheet 3 and the conveying belt 33. Accordingly, the charges on the conveying belt 33 and the charges induced on the sheet 3 being conveyed electrostatically attract each other, so that the sheet 3 electrostatically adheres to the conveying belt 33. Therefore, warpage and irregularities are corrected in the sheet 3 strongly adhering to the conveying belt 33, so that a highly flat surface thereof can be obtained.

Figure 5:
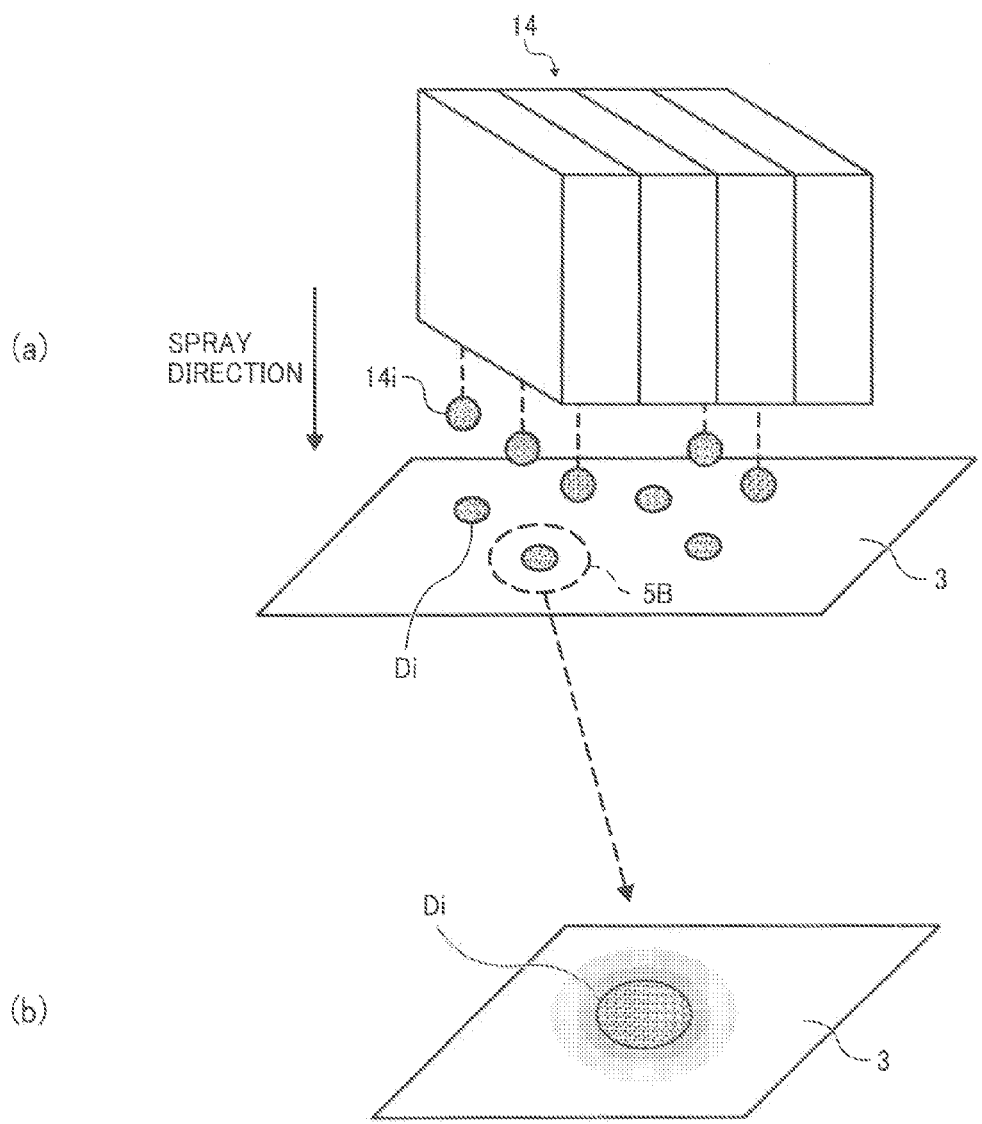
FIG. 5 is an explanatory diagram for explaining recording operations by the apparatus.

Then, the conveying belt 33 is rotated to move the sheet 3, and the recording head 14 is driven according to an image signal while the carriage 13 is moved for scanning in one direction or in reciprocal directions. Accordingly, as shown in FIG. 5, the recording head 14 is caused to eject (spray) liquid droplets 14i such that ink droplets being liquid droplets land onto the sheet 3 being stopped, whereby dots Di are formed, and recording for one line is completed. Subsequently, the sheet 3 is conveyed a predetermined distance, and then next recording is performed. When a recording end signal or a signal indicating that a trailing end of the sheet 3 has reached a recording region is received, a recording operation is ended. Here, a dot Di portion shown in (a) of FIG. 5 is enlarged in (b) of FIG. 5.

In this manner, the sheet 3 on which an image is recorded is discharged onto the discharge tray 6 by the discharging roller 38.

Figure 6:
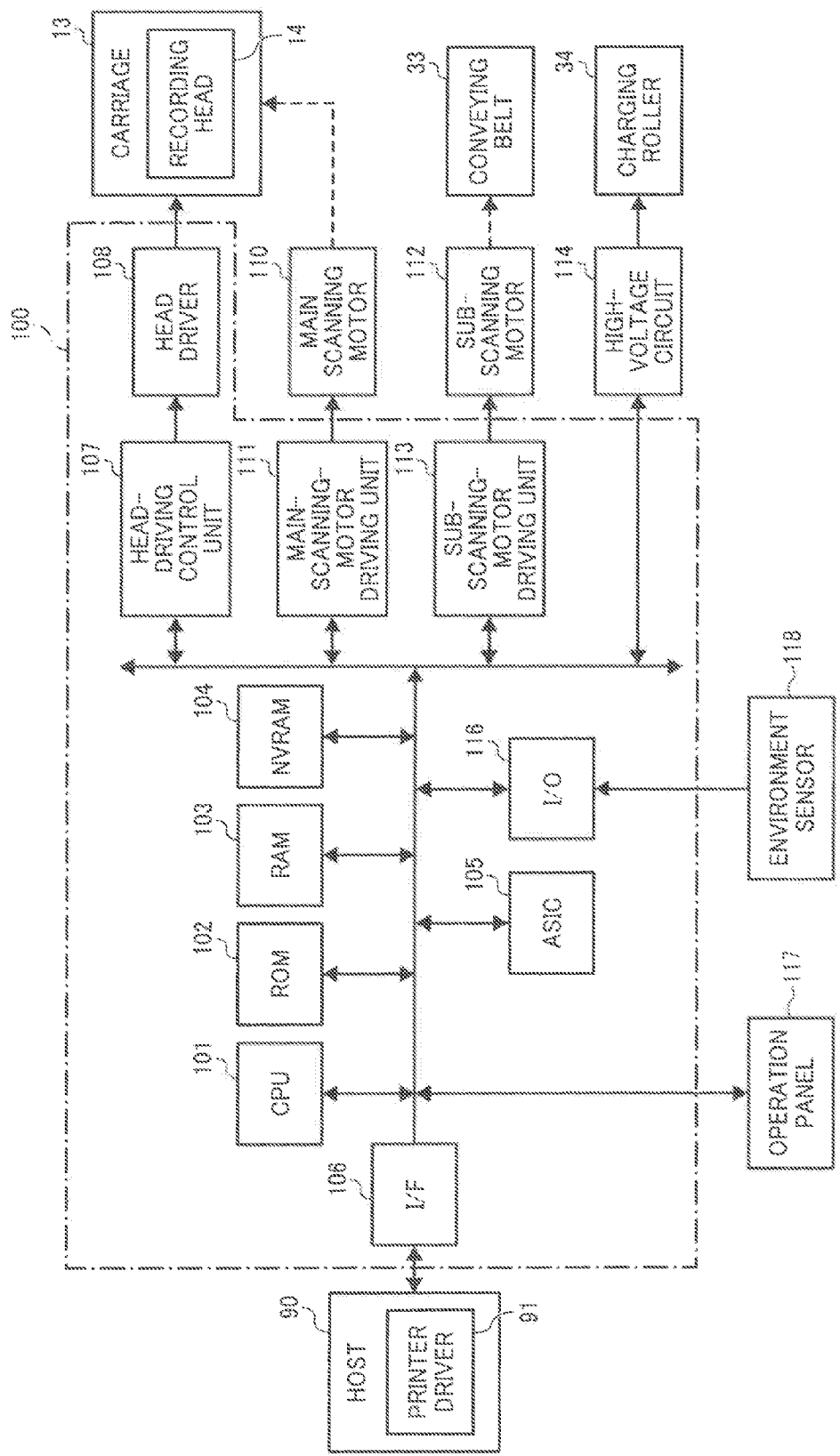
FIG. 6 is a block diagram of a general configuration of a control unit of the apparatus.

Next, an overview of a control unit of the image forming apparatus is described below with reference to FIG. 6. FIG. 6 is a block diagram of the whole control unit. A control unit 100 includes a CPU 101 that controls the whole apparatus; a ROM 102 for storing computer programs to be executed by the CPU 101 and other fixed data; a RAM 103 for temporarily storing image data and the like; a nonvolatile memory (NVRAM) 104 for storing data even when power of the apparatus is shut off; and an ASIC 105 that performs various types of signal processing, image processing for sorting and the like, and processing on input signals to control the whole apparatus.

The control unit 100 also includes an I/F 106 for transmitting and receiving data and signals to and from a host 90 side being a data processing apparatus such as a personal computer on which a printer driver according to the present invention is mountable; a head-driving control unit 107 and a head driver 108 that control driving of the recording head 14; a main-scanning-motor driving unit 111 that drives a main-scanning motor 110; a sub-scanning-motor driving unit 113 that drives a sub-scanning motor 112; a subsystem driving unit 294 that drives a subsystem 71; an environment sensor 118 that detects environmental temperature and/or environmental humidity; and an I/O 116 for inputting detection signals from various sensors not illustrated.

To the control unit 100 is connected with an operation panel 117 for inputting and displaying information necessary for the apparatus. The control unit 100 controls to switch ON/OFF of a high-voltage circuit (high-voltage power supply) 114 that applies a high voltage to the charging roller 34, and also controls to change output polarity.

The control unit 100 receives, through the I/F 106, print data including image data from the host 90 side, e.g., a data processing apparatus such as a personal computer; an image reading apparatus such as an image scanner; and an imaging apparatus such as a digital camera, via a cable or a network. The print data is created and output to the control unit 100 by a printer driver 91 according to the present invention, which is provided in the host 90 side.

The CPU 101 reads and analyzes the print data in a receiving buffer included in the I/F 106, causes the ASIC 105 to perform a data sorting process and the like, and sends image data to the head-driving control unit 107. As described above, the print data for outputting an image is converted into bitmap in such a manner that the printer driver 91 of the host 90 side loads the image data as the bitmap data and sends the bitmap data to the apparatus. However, the conversion may be performed by storing font data in the ROM 102.

When receiving image data (dot pattern data) corresponding to one line of the recording head 14, the head-driving control unit 107 outputs, as serial data, the dot pattern data for one line to the head driver 108 in synchronization with a clock signal, and also outputs a latch signal to the head driver 108 at predetermined timing.

The head-driving control unit 107 includes a ROM (which may be formed of the ROM 102) that stores therein pattern data of a drive waveform (drive signal), a waveform generator circuit including a D/A converter that performs D/A conversion on data of the drive waveform read from the ROM, and a drive-waveform generator circuit formed of an amplifier and the like.

The head driver 108 includes a shift register that inputs the clock signal and the serial data as the image data received from the head-driving control unit 107; a latch circuit that latches a register value by the latch signal received from the head-driving control unit 107; a level converting circuit (level shifter) that changes the level of an output value of the latch circuit; an analog switch array (switch unit) that is controlled to be turned ON/OFF by the level converting circuit. The head driver 108 controls ON/OFF of the analog switch array so as to selectively apply a predetermined drive waveform to actuator means of the recording head 14 to thereby drive the head.

Next, another example of the data processing apparatus including the printer driver according to the present invention, which functions as a host side that transfers image data so that the image forming apparatus can form an image, will be described below with reference to FIGS. 7 and 8.

Figure 7:
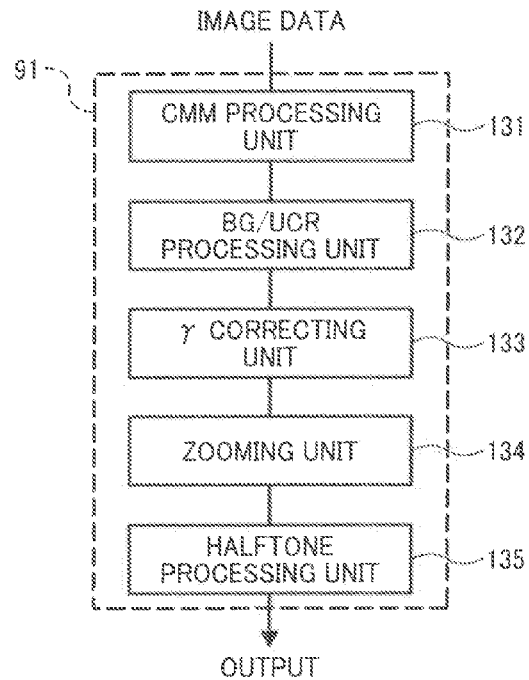
FIG. 7 is a block diagram for functionally explaining an example of a structure of a printer driver of a data processing device according to the present invention.

In the example shown in FIG. 7, the printer driver 91 of the data processing apparatus includes a CMM (Color Management Module) processing unit 131 that converts a color space for monitor display to a color space for the recording apparatus (from RGB color system to CMY color system) for image data provided by application software, an BG/UCR (black generation/Under Color Removal) processing unit 132 that performs black generation/under color removal based on a CMY value, a γ correcting unit 133 that performs input-output correction to reflect characteristics of the recording apparatus or user's preference, a zooming unit 134 that performs a zoom process according to resolution of the recording apparatus, and a halftone processing unit 135 provided with a multi-valued/non-multi-valued matrix for replacing the image data with a pattern array of dots ejected from the recording apparatus.

Figure 8:
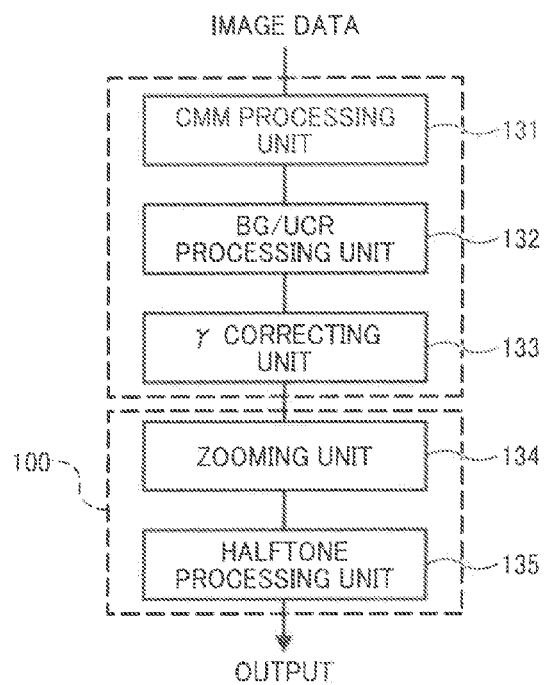
FIG. 8 is a block diagram for functionally explaining another example of the structure of the printer driver of the data processing device according to the present invention.

In the example shown in FIG. 8, the printer driver 91 of the data processing apparatus includes the CMM (Color Management Module) processing unit 131 that converts a color space for monitor display to a color space for the recording apparatus (from RGB color system to CMY color system) for image data provided by application software, the BG/UCR (black generation/Under Color Removal) processing unit 132 that performs black generation/under color removal based on a CMY value, and the γ correcting unit 133 that performs input-output correction to reflect characteristics of the recording apparatus or user's preference.

In the configuration shown in FIG. 8, the control unit 100 of the image forming apparatus includes the zooming unit 134 that receives output data subjected to the γ correction process and that performs a zoom process according to resolution of the recording apparatus, and the halftone processing unit 135 provided with the multi-valued/non-multi-valued matrix for replacing the image data with a pattern array of dots ejected from the recording apparatus.

In other words, in FIGS. 7 and 8, the image data processed on the computer is formed as data in an RGB color system because its color space is formed on assumption that the image data is to be displayed on a monitor. However, when the image data is to be output by a printer (the recording apparatus), it needs to be converted into data for a CMYK color space. Therefore, the CMM processing unit 131 performs color space conversion from RGB to CMY, and the BG/UCR processing unit 132 generates black data "K" from CMY.

The γ correction performed by the γ correcting unit 133 is fine adjustment of each CMYK data and is a process of adjusting a data level to reflect output characteristics of the printer and settings by a user. The zooming unit 134 breaks down data at one pixel of a monitor to increase the resolution and thereby compensates for a deficient amount information by dot density so that the printer having less amount of information per pixel than the monitor can implement tone expression.

The halftone processing unit 135 performs a threshold matrix process (halftone process) for replacing multi-valued data (m value) generated for monitor display with multi-valued data (n1 value) that can be output by the printer or non-multi-valued data (n2 value) (m>n1≧n2≧2). The multi-valued/non-multi-valued matrix used by the halftone processing unit 135 is employed in a so-called dithering process using a threshold matrix as shown in FIG. 9 or a so-called error diffusion process as shown in FIG. 10 to perform a process for replacing original multi-valued data with dot ON/OFF.

Figure 9:
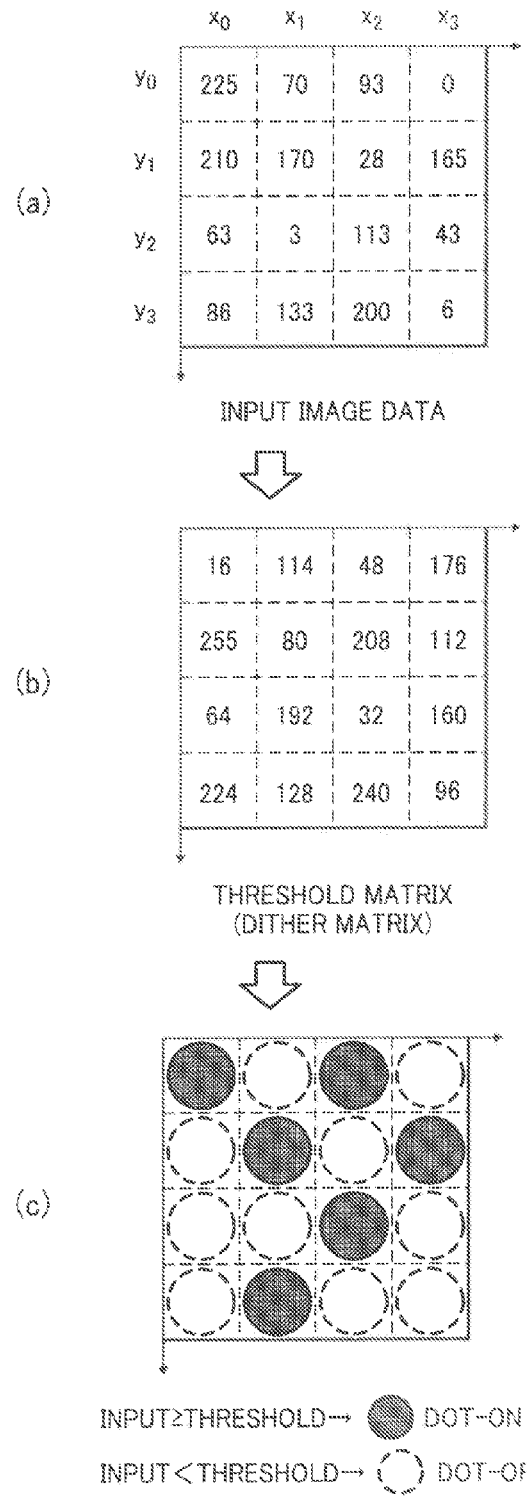
FIG. 9 is an explanatory diagram for explaining a halftone process by the dither method.

The "dithering process" shown in FIG. 9 is a method in which multi-valued image data input as shown in (a) of the figure is compared with a dither matrix being a threshold matrix generated by a predetermined method as shown in (b) of the figure, and only pixels having values equal to or larger than (or smaller than) a threshold are replaced with dots as shown in (c) of the figure. While only two values of ON/OFF are illustrated in the figure, if non-multi values having a combination other than those described above are processed, a reproducible tone region is segmented into a small dot, a medium dot, and a large dot for example, and a threshold matrix corresponding to each dot size is applied and compared with input image data to replace the image data with a corresponding dot.

The error diffusion process shown in FIG. 10 is significantly complicated compared to the dithering process. The figure illustrates a procedure of binary error diffusion in which a threshold process is performed per pixel, and an error obtained each time is maintained and reflected in subsequent calculations at a predetermined rate. Consequently, information forcibly cut off in the dithering process can be fed back to an output image, so that quality in resolution and the like can be improved compared to that of a dither image.

[Halftone Processing Unit]

With reference to FIGS. 11 to 17, an example in which the halftone processing unit 135 performs the error diffusion process is described in detail below. In the present embodiment, the error diffusion process is performed per pixel in order from a color that largely affects visual appearance (e.g., in order of BLACK→CYAN→MAGENTA→YELLOW for a four-color printer) in consideration of a color having larger influence than a processing target color. Regarding the color that largely affects visual appearance, colors with low brightness or an evaluation value disclosed in Japanese Patent Application Laid-open No. H10-23191 may be used.

Figure 11:
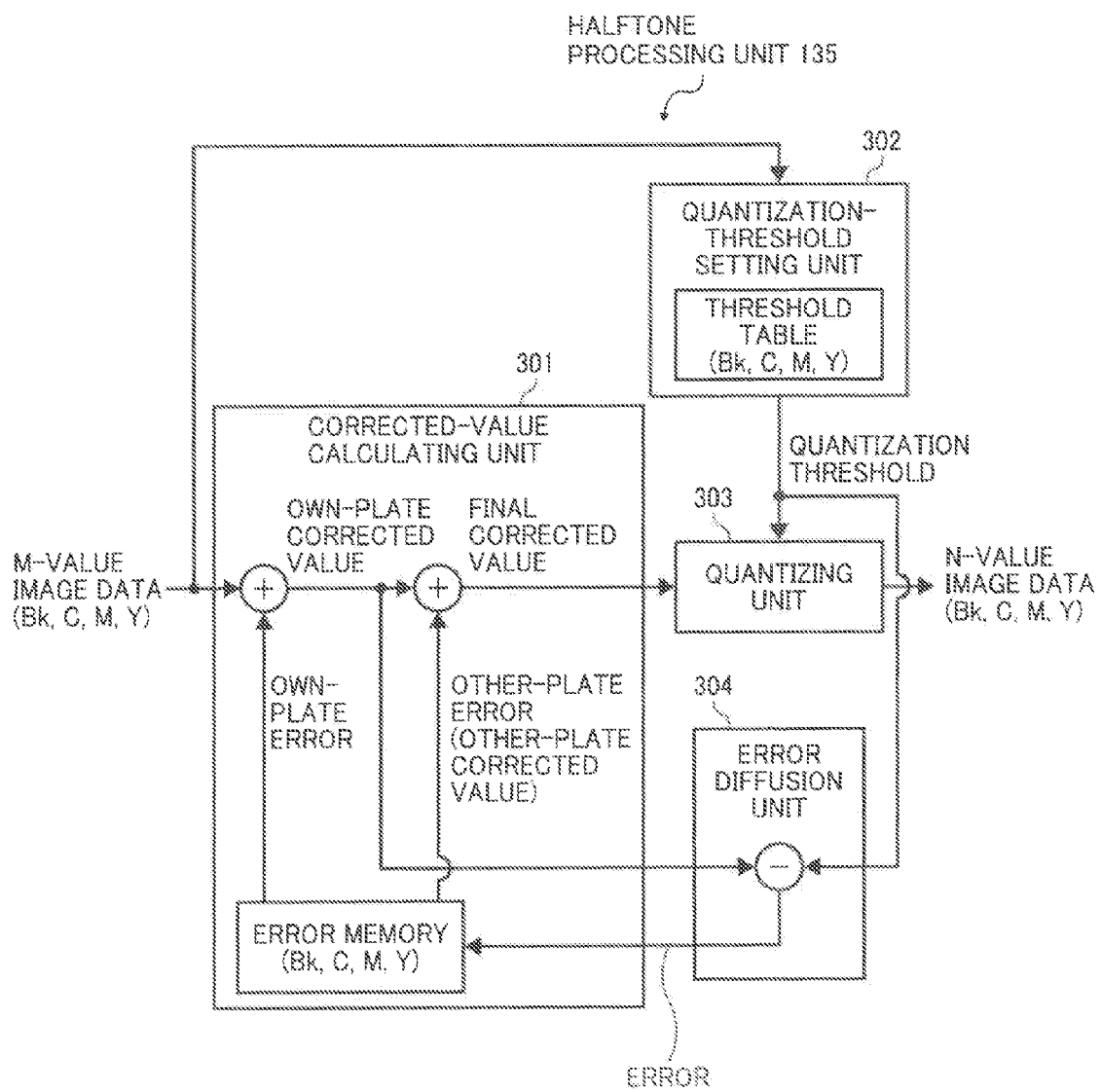
FIG. 11 is a diagram illustrating a schematic functional configuration of a halftone processing unit according to the present embodiment.

FIG. 11 is a diagram illustrating a schematic functional configuration of the halftone processing unit 135 according to the present embodiment. The halftone processing unit 135 of the present embodiment quantizes M-value image data containing at least two types of color components into N-value image data for each color component (M>N>1). As shown in FIG. 11, the halftone processing unit 135 includes a corrected-value calculating unit 301 that calculates a final corrected value by adding an error diffused from a neighboring quantized pixel value corresponding to a processing-target color component of a pixel of interest in the M-value image data and an error diffused from a quantized pixel value corresponding to a color component different from the processing-target color component to a pixel value corresponding to the processing-target color component; a quantization-threshold setting unit 302 that sets a quantization threshold based on a pixel value corresponding to the processing-target color component of the pixel of interest; a quantizing unit 303 that compares the final corrected value with the quantization threshold and outputs N-value image data of the processing-target color component; and an error diffusion unit 304 that calculates and accumulates an error (own-plate corrected value−quantization threshold) caused by generation of the N-value image data. The figure illustrates a configuration example in which each color (Bk, C, M, Y) is processed in series; however, each color may be processed in parallel (illustration is omitted).

In the technology disclosed in the above-mentioned Japanese Patent Application Laid-open No. H10-23191, variable spatial-frequency components for a brightness component and chromaticity components are calculated based on brightness L* and chromaticity a* and b* of each color material; the calculated spatial-frequency component is corrected based on spatial frequency characteristics of a visual system; an evaluation value of the brightness component and evaluation values of the chromaticity components are calculated by integrating the corrected spatial-frequency component; brightness feature is corrected by multiplying the calculated evaluation value of the brightness component by a weighting function that monotonically increases with average brightness; and the corrected value is used as an evaluation value (granularity evaluation value).

Figure 12:
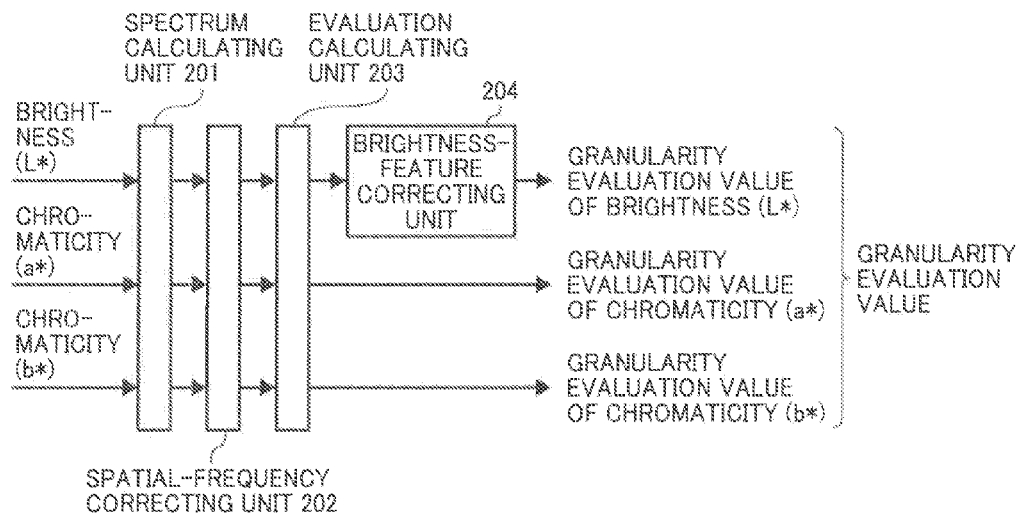
FIG. 12 is an explanatory diagram for explaining a process for determining an evaluation value.

A Process for determining the evaluation value is described below with reference to FIG. 12. In the figure, a spectrum calculating unit 201 calculates a variable spatial-frequency component for each of the components $L^*(x)$, $a^*(x)$, $b^*(x)$. This is because granularity occurs due to variation in each of the components $L^*(x)$, $a^*(x)$, $b^*(x)$. Here, x represents a position on a spatial image of a target image. More specifically, as represented by the following Equation (1), an average value of each component is subtracted from each of the components L*(x), a*(x), b*(x).

$$L'^*(x)=L^*(x)-L^*0$$

$$a'^*(x)=a^*(x)-a^*0$$

$$b'^*(x)=b^*(x)-b^*0 \qquad (1)$$

where, L*0, a*0, b*0 represent the average values.

The variable spatial-frequency components of respective components are represented by the following equation (2).

$$AL^*(f)=|F[L'^*(x)]|$$

$$Aa^*(f)=|F[a'^*(x)]|$$

$$Ab^*(f)=|F[b'^*(x)]| \qquad (2)$$

where F[ ] represents Fourier transformation.

A spatial-frequency correcting unit 202 corrects the variable spatial-frequency components of the respective components based on visual spatial-frequency characteristics. The visual spatial-frequency characteristics of humans have characteristics with low sensitivity to high frequencies, like so-called low-pass filters. Therefore, among the above-mentioned variable spatial-frequency components, variation that causes the granularity is based on low-frequency components, and high frequency components can hardly cause the granularity. In the present embodiment, as the visual spatial-frequency characteristics, the following equation (3) is applied, which is disclosed in "On Investigation of the Factors Influencing the Perceived Sharpness of Electrophotographic Lines": Annual Conference of SPIE 1979" written by Dooley, et al.

$$VTF(ff)=5.05 \cdot \exp(-0.138 \cdot ff) \cdot (1-\exp(-0.1 \cdot ff)) \qquad (3)$$

where ff is spatial frequency on retina and is measured in cycle/degree. When an observation distance to an image to be evaluated is 350 mm, the above Equation (3) is represented by the following Equation (3)' where f represents the spatial frequency (cycle/mm).

$$VTF(f)=5.05 \cdot [\exp(-0.843 \cdot f)-\exp(-1.451 \cdot f)] \qquad (3)'$$

As represented by the following Equation (4), the variable spatial-frequency components of respective components (the above Equation (2)) which are calculated by the spectrum calculating unit 201 are multiplied by the visual spatial-frequency characteristics.

$$PL(f)=AL^*(f) \cdot VTF(f)$$

$$Pa(f)=Aa^*(f) \cdot VTF(f)$$

$$Pb(f)=Ab^*(f) \cdot VTF(f) \qquad (4)$$

An evaluation calculating unit 203 integrates the variable spatial-frequency components per component. More specifically, the variable spatial-frequency components corrected according to the above Equation (4) with the visual spatial-frequency characteristics obtained by the spatial-frequency correcting unit 202 are integrated as represented by the following Equation (5). Consequently, a computational psychological index (an evaluation value, i.e., noise (in granular shape) perceived by a human when he/she views an evaluation target image) can be obtained.

$$GL(f)=\int AL^*(f) \cdot VTF(f) df$$

$$Ga(f)=\int Aa^*(f) \cdot VTF(f) df$$

$$Gb(f)=\int Ab^*(f) \cdot VTF(f) df \qquad (5)$$

A brightness-feature correcting unit 204 corrects average brightness. In other words, the average brightness is corrected by applying a function h(L*0), in which the average brightness L*0 is used as a parameter, to only the brightness component among the evaluation values obtained by Equation (5). In the experiments disclosed in Japanese Patent Application Laid-open No. H10-23191, granularity is more perceived as the average brightness is increased (lightened), and a monotonically increasing function is suitably applied as a correction function for the average brightness. Assuming that the correction function is H(L*0), a granularity evaluation value G'L(f) of the corrected brightness component can be represented by the following Equation (6).

$$G'L(f)=H(L^*0) \cdot \int AL^*(f) \cdot VTF(f) df \qquad (6)$$

According to the experiments disclosed in Japanese Patent Application Laid-open No. H10-23191, the correction function is desired to be a function that monotonically increases with the average brightness. In this manner, by multiplying the evaluation value of the brightness component by a weighting function that monotonically increases with the average brightness, it is possible to correct brightness-difference detection characteristics of a visual system.

In the present embodiment, considering the above evaluation-value determining method, an example is described in which the error diffusion process is performed in order of BLACK→CYAN→MAGENTA→YELLOW, because the granularity evaluation value is increased in order of BLACK→CYAN→MAGENTA→YELLOW.

When the process is performed in the above-mentioned order and if MAGENTA of a target pixel is processed, it is necessary to consider neighboring dots of MAGENTA itself and positional relations with BLACK/CYAN dots to prevent abutting and overlapping of dots. However, regarding YELLOW for which a granularity evaluation value is small (for which priority of consideration is low), consideration is undertaken when a process for YELLOW is performed, so that the consideration is not necessary at this time. Therefore, whether or not to output a dot for MAGENTA is determined on the assumption that "dots output for BLACK/CYAN are already output for MAGENTA". It is preferable to consider positional relations of BLACK dots when a process for CYAN of the target pixel is performed. And it is preferable to consider positional relations of BLACK/CYAN/MAGENTA dots when a process for YELLOW is performed.

Figure 13:
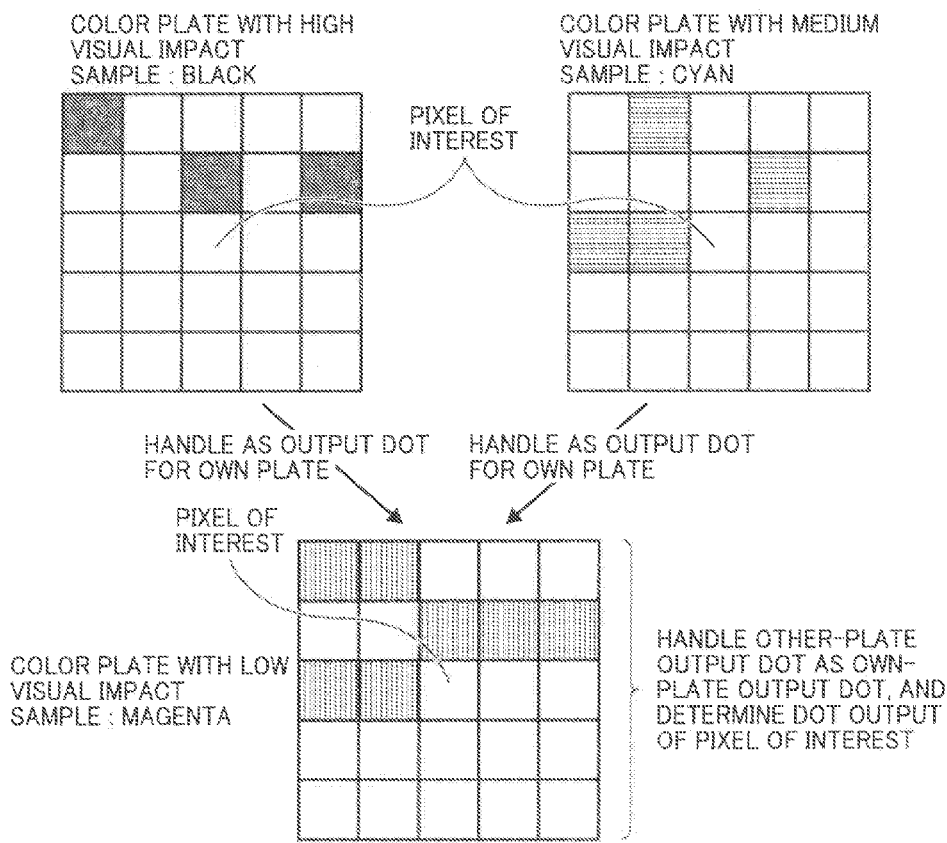
FIG. 13 is an explanatory diagram for explaining a concept of an error diffusion process according to the present embodiment.

FIG. 13 is an explanatory diagram for explaining a concept of the error diffusion process according to the present embodiment. In the error diffusion process performed by the halftone processing unit 135 of the present embodiment, three-staged processes being an other-plate error acquiring process, an own-plate error acquiring process, and a dot-type determining process are performed.

In the other-plate error acquiring process, neighboring pixels in higher-priority color plates (in the example of FIG. 13, BLACK/CYAN) than the own plate (in the example of FIG. 13, MAGENTA) are referred to, and each accumulated error at a position of the pixel of interest is extracted. In the present other-plate error acquiring process, an error accumulated in the other plate (an other-plate error) is handled as an own-plate error so that a droplet for the own plate is output in consideration of pixel positions where droplets have already been output in more influential color plates. Therefore, overlapping and abutting of droplets can be prevented.

In some cases, even when droplets have been output in more influential color plates, it is not necessary to avoid overlapping of droplets depending on input tone used when outputting a droplet. Therefore, it is possible to handle the other-plate error as the own-plate error only when "droplet is output, and the droplet is a droplet for which overstrking need to be avoided". The "droplet to be avoided (avoidance target droplet)" is a droplet for which it is determined that the sheet is not filled with droplets of the same type as that of the output droplet, and the droplet is determined based on the input tone and droplet-solid tone at the time of output.

Figure 14A:
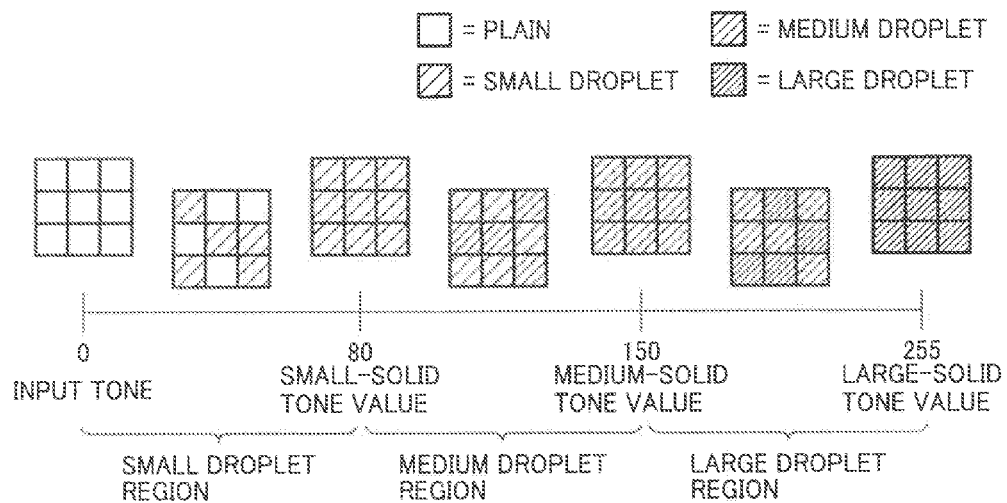
FIG. 14A is a diagram for explaining droplets to be avoided and droplets not necessarily to be avoided.
Figure 14B:
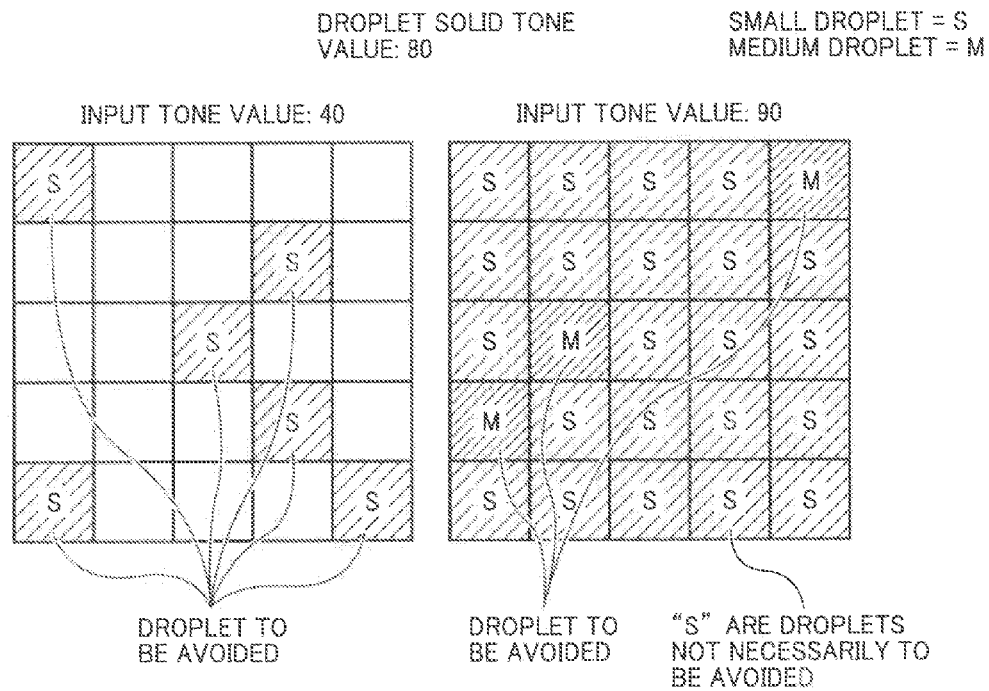
FIG. 14B is a diagram for explaining droplets to be avoided and droplets not necessarily to be avoided.

FIGS. 14A and 14B are diagrams for explaining droplets to be avoided and droplets not necessarily to be avoided. In FIGS. 14A and 14B, a droplet to be avoided is (1) a small droplet in a small droplet region, (2) a medium droplet in a medium droplet region, and (3) a large droplet in a large droplet region. On the other hand, a droplet not necessarily to be avoided is a small droplet at a small-solid tone value, (2) a small droplet in a medium droplet region, (3) a medium droplet at a medium-solid tone value, (4) a medium droplet in a large droplet region, and (5) a large droplet at a large-solid tone value.

Furthermore, the other-plate error is extracted and collected for not only a pixel of interest for an error-diffusion target color but also neighboring pixels, so that dispersibility between colors can be improved. It is possible to multiply the collected other-plate error by a weighting coefficient by a matrix and handle the obtained error as the other-plate error for the pixel of interest. FIGS. 15A and 15B illustrate examples of the error diffusion matrix (the threshold matrix). FIG. 15A illustrates an example of a conventional error-diffusion matrix, in which an error at a position of a pixel of interest is obtained from neighboring pixels in the own plate, so that the pixel of interest is excluded from the matrix. FIG. 15B illustrates an other-plate error-diffusion matrix according to the present embodiment, in which an error of a pixel of interest (bold face) in the own plate is obtained from neighboring errors in the higher-priority color plate other than the own plate, so that the pixel of interest is included in the matrix.

To prevent redundant acquisition of errors of each color plate, the number of times of error extraction at an identical pixel position may be limited to one such that an error is extracted only from the higher-priority color plate. Consequently, overlapping and abutting of dots for a higher-priority color can preferentially be avoided.

In the own-plate error acquiring process, errors accumulated before the pixel of interest are acquired by a matrix. This process can be performed similarly to a conventional process. At this state, to prevent redundant acquisition of errors, it is possible not to acquire an own-plate error at a pixel position where an error has been acquired through the other-plate error acquiring process.

In the dot-type determining process, a tone value (final corrected value (in consideration of other color) obtained by adding an other-color error and an own-color error to an input tone value of the pixel of interest is compared with a dot threshold (quantization threshold) determined depending on the input tone value, whereby a dot type for the pixel of interest is determined (the dot type may be "plain", "small droplet", "medium droplet", and "large droplet" for quaternary output). Regarding the dot threshold, a threshold determined based on technologies disclosed in Japanese Patent Application Laid-open No. 2000-270210 and Japanese Patent No. 3732470 for example can be used; therefore, detailed explanation will be omitted. When a dot is to be output after the dot type is determined, a difference between the tone value (own-plate corrected value), which is obtained by adding the own-color error to the input tone value of the pixel of interest, and the dot threshold is accumulated as an error at a position of the pixel of interest (error=own-plate corrected value−dot threshold), and the error is used for successive pixels. When a dot is not to be output, the own-plate corrected value is accumulated as the error (error=own-plate corrected value).

Figure 16:
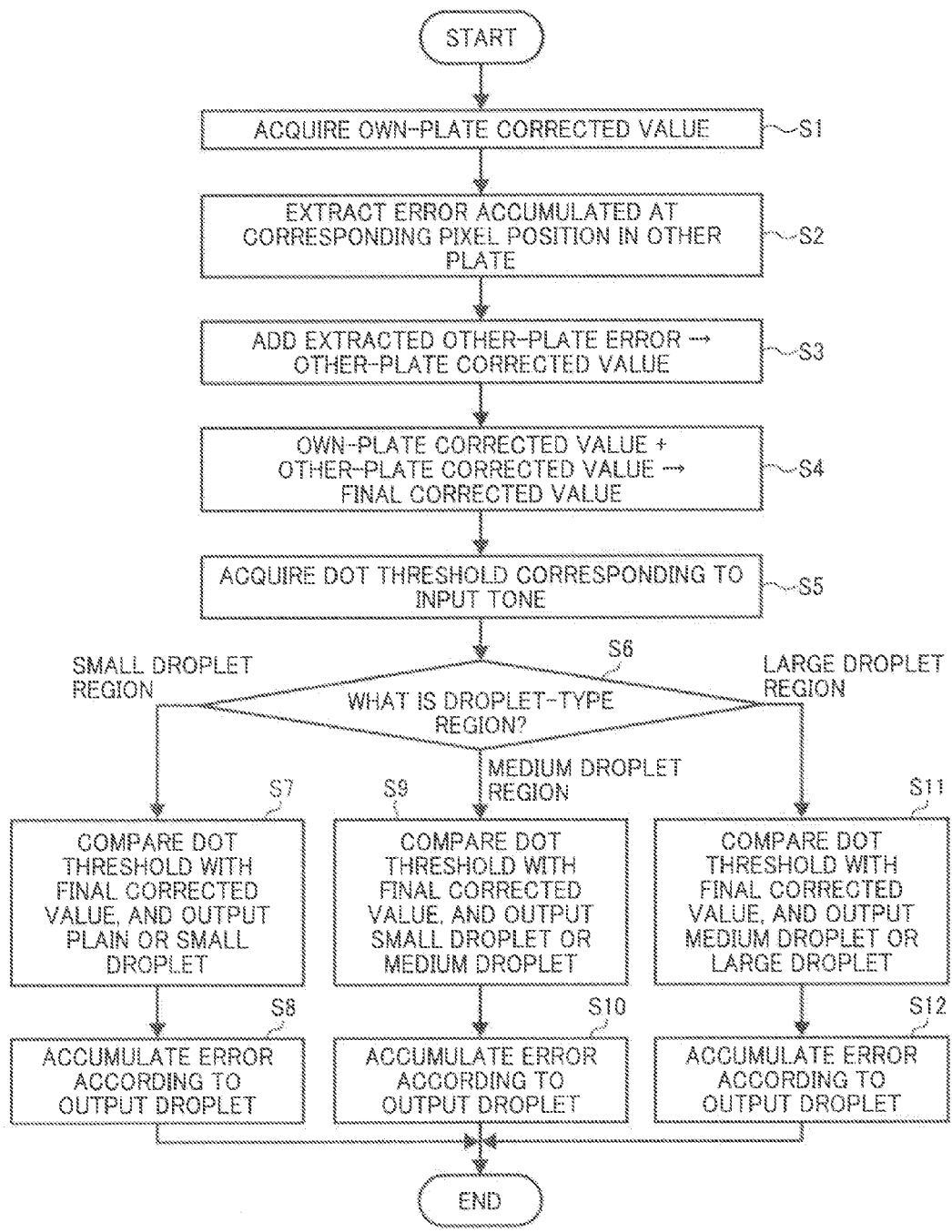
FIG. 16 is a flowchart for explaining an error diffusion process according to a first example, which is performed by the halftone processing.

FIG. 16 is a flowchart for explaining an error diffusion process according to a first example, which is performed by the halftone processing unit 135. The error diffusion process according to the first example is configured to refer to all errors in the other plate. In the figure, an own-plate corrected value is acquired (Step S1). Then, an error accumulated at a corresponding pixel position in the other plate is extracted (Step S2), and an other-plate corrected value is calculated by the addition of the extracted error (Step S3). A final corrected value is then calculated by adding the other-plate corrected value to the own-plate corrected value (Step S4). Subsequently, a dot threshold corresponding to the input tone is acquired (Step S5). Then, it is determined whether a droplet-type region is a small droplet region, a medium droplet region, or a large droplet region (Step S6).

At Step S6, when it is determined to be the small droplet region, the dot threshold and the final corrected value are compared with each other. When the final corrected value < the dot threshold, plain is output, and, when the final corrected value ≧ the dot threshold, a small droplet is output (Step S7). Then, an error is accumulated according to the output droplet (Step S8).

Furthermore, at Step S6, when it is determined to be the medium droplet region, the dot threshold and the final corrected value are compared with each other. When the final corrected value < the dot threshold, a small droplet is output, and, when the final corrected value ≧ the dot threshold, a medium droplet is output (Step S9). Then, an error is accumulated according to the output droplet (Step S10).

Moreover, at Step S6, when it is determined to be the large droplet region, the dot threshold and the final corrected value are compared with each other. When the final corrected value < the dot threshold, a medium droplet is output, and when the final corrected value ≧ the dot threshold, a large droplet is output (Step S11). Then, error is accumulated according to the output droplet (Step S12).

Figure 17:
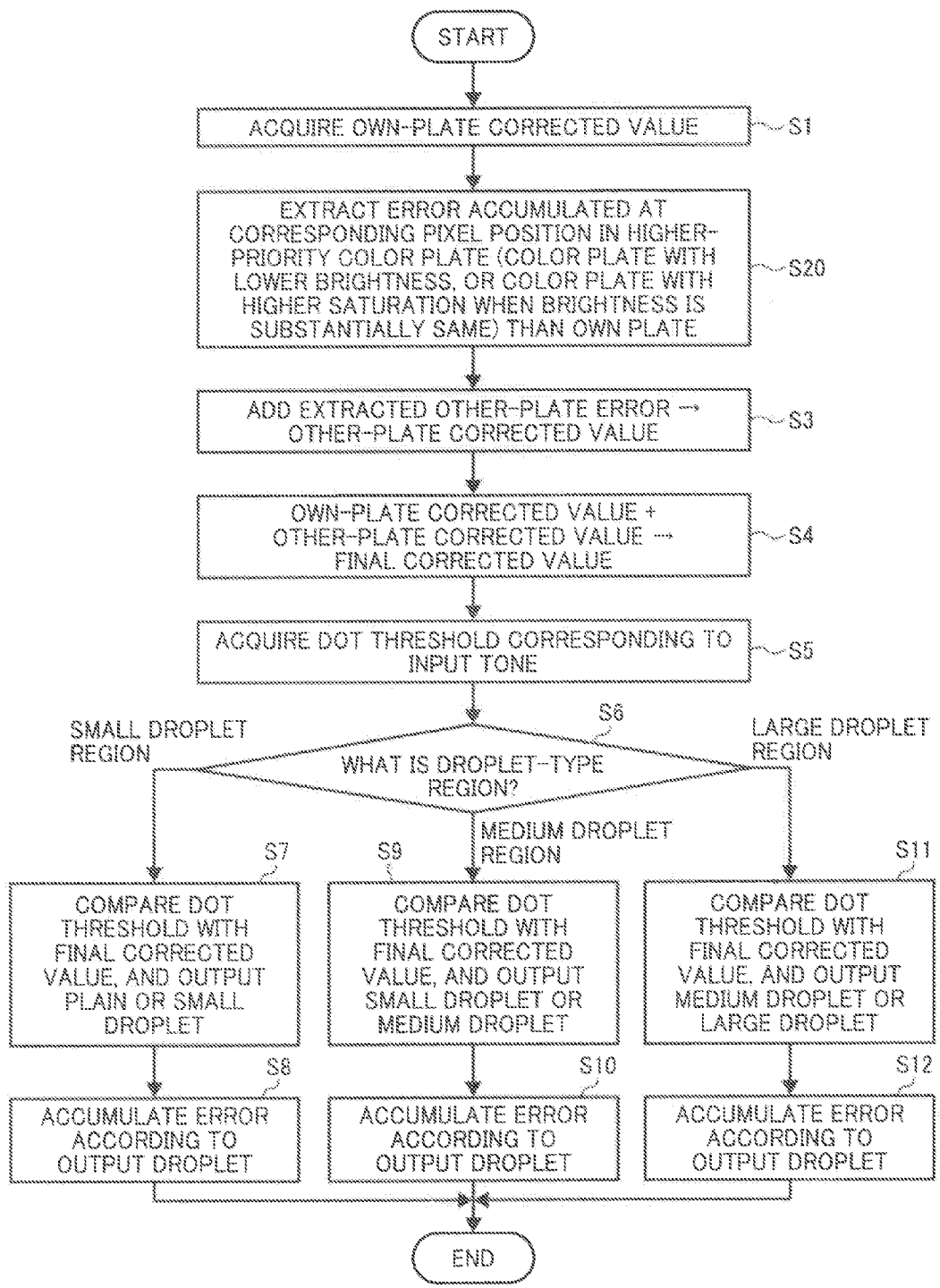
FIG. 17 is a flowchart for explaining an error diffusion process according to a second example, which is performed by the halftone processing.

FIG. 17 is a flowchart for explaining an error diffusion process according to a second embodiment, which is performed by the halftone processing unit 135. In the first example, all errors in the other plate are referred to. However, in the second example, only errors in a higher-priority color plate than the own plate are referred to so as to preferentially arrange color that largely affects visual appearance. In FIG. 17, Steps, at which processes identical to those of FIG. 16 are performed, will be denoted by identical Step numbers. Accordingly, explanation of the common Steps will be omitted and only a different Step will be described below.

In FIG. 17, at Step S20, an error accumulated at a corresponding pixel position in the higher-priority color plate than the own plate (i.e., in a color plate with lower brightness, or when the brightness is substantially the same, in a color plate with higher saturation) is extracted. Then, an other-plate corrected value is calculated by the addition of the extracted error (Step S3).

Figure 18:
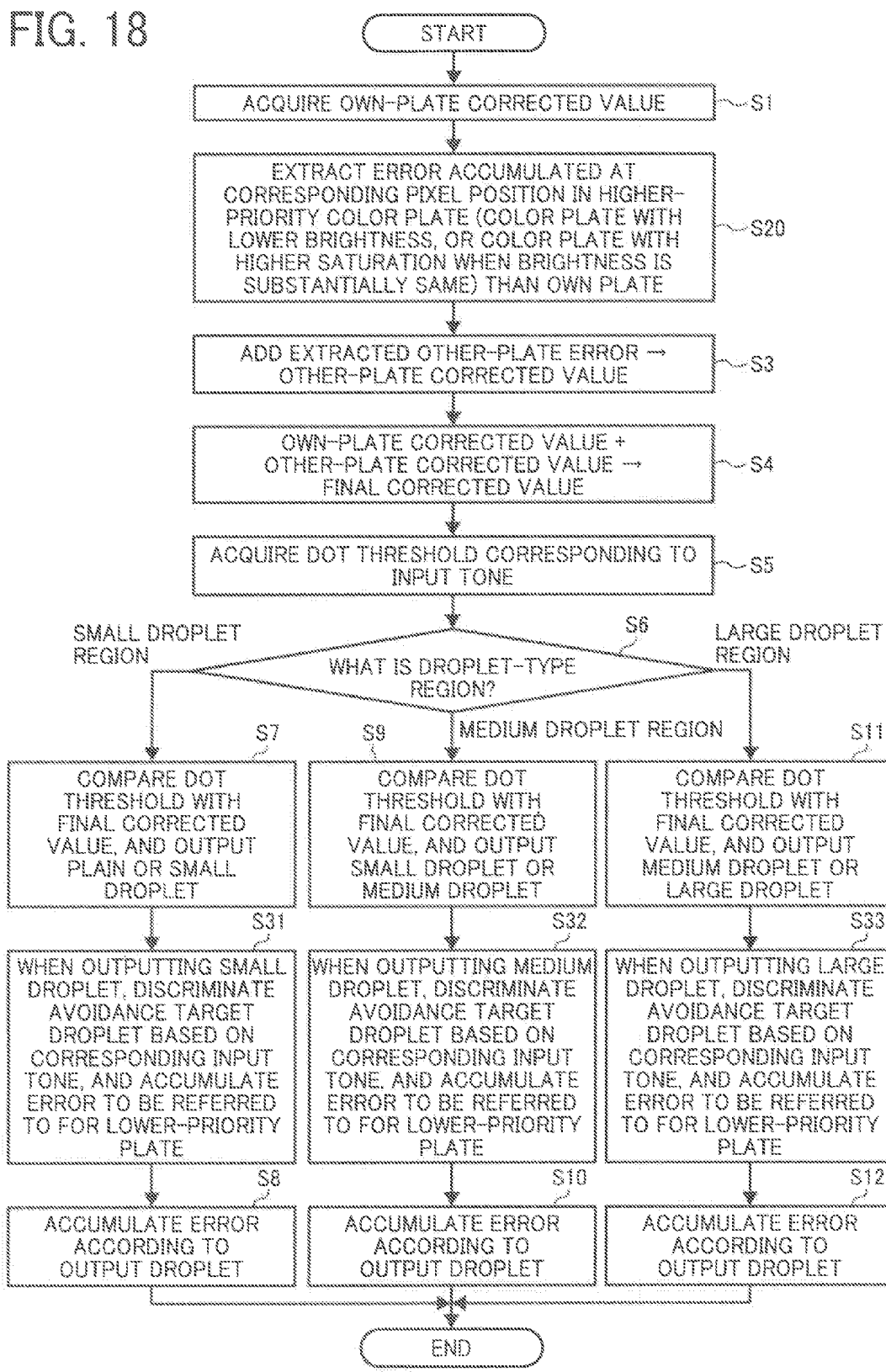
FIG. 18 is a flowchart for explaining an error diffusion process according to a third example, which is performed by the halftone processing.

FIG. 18 is a flowchart for explaining an error diffusion process according to a third example. In the second example, all errors in the higher-priority color plate are referred to. However, in the third example, other-plate errors are accumulated only for avoidance target droplets (see FIGS. 14A and 14B) so that the avoidance target droplets in the higher-priority color plate can assuredly be avoided in a lower-priority color plate. In FIG. 18, Steps, at which processes identical to those of FIG. 17 are performed, will be denoted by identical Step numbers. Accordingly, explanation of the common Steps will be omitted and only different Steps will be described.

In FIG. 18, at Steps S31 to S33, when a small droplet, a medium droplet, or a large droplet is output, an avoidance target droplet is determined based on corresponding input tone, and an error to be referred to for a lower-priority color plate is accumulated.

As described above, according to the first embodiment, in the image processing apparatus that quantizes the M-value image data into the N-value (M>N>1) for each predetermined color component (e.g., C, M, Y, Bk), the halftone processing unit 135 includes the corrected-value calculating unit 301 that calculates the final corrected value by adding an error diffused from a neighboring quantized pixel value corresponding to a processing-target color component and an error diffused from a quantized pixel value corresponding to a color component different from the processing-target color component to a pixel value corresponding to the processing-target color component of a pixel of interest in the M-value image data; the quantization-threshold setting unit 302 that sets the quantization threshold based on a pixel value corresponding to the processing-target color component of multi-valued image data of the pixel of interest; the quantizing unit 303 that compares the final corrected value with the quantization threshold and outputs the N-value image data of the processing-target color component; and the error diffusion unit 304 that calculates and accumulates an error (own-plate corrected value−quantization threshold) caused by generation of the N-value image data. Thus, whether or not to output a dot is determined in consideration of dots in the higher-priority color plate and dots in the own plate, so that it is possible to prevent abutting and overlapping of dots in secondary or later color.

Furthermore, according to the first embodiment, the above-mentioned different color component corresponds to either color with lower brightness than processing-target color or color that largely influences granularity compared to the processing-target color. Therefore, color that largely affects visual appearance can be used as the higher-priority color plate.

Moreover, according to the first embodiment, an error from the above-mentioned different color component is adjusted by using a coefficient corresponding to the brightness. Therefore, the amount of an other-color error can be adjusted according to the influence on visual appearance.

Furthermore, according to the first embodiment, an error from the above-mentioned different color component is diffused only from a pixel for which a dot is generated, from among quantized pixels. Therefore, it is possible to determine whether or not to output a dot while effectively avoiding a portion where dots are output in the other color plate.

Moreover, according to the first embodiment, an error from the above-mentioned different color component is diffused based on a predetermined filter, the multi-valued image data of a different color component, or both the multi-valued image data of the pixel of interest and the multi-valued image data of the different color component. Therefore, it is possible to optimally determine whether or not to output a dot in the own plate depending on an output state of other-color dots near the pixel of interest.

In the first embodiment described above, the image forming apparatus that uses recording materials for four colors of C, M, Y, K is described. In a second embodiment, an example is described in which one or more recording materials for light colors are used in addition to the recording materials for four colors of C, M, Y, K. That is, in addition to the color materials for a plurality of color components having different hues (e.g., C, M, Y, Bk), one or more recording materials are used for color components (e.g., Light C, Light M) that have hues identical to one or more color components among the plurality of color components having the different hues, and that have different brightness.

As described in the first embodiment, in case of the four-color printer, the error diffusion process is performed per pixel in order from the color that most affects visual appearance (in order of BLACK→CYAN→MAGENTA→YELLOW) in consideration of color having larger influence than error-diffusion target color. In this case, the color that largely affects visual appearance primarily corresponds to color with low brightness, and secondly corresponds to color having higher saturation when the brightness is substantially the same. For example, when processing for MAGENTA is performed, whether or not to output a MAGENTA dot is determined based on the assumption that "dots output for BLACK/CYAN are already output for MAGENTA" to prevent dots from being output to be overlapped with the BLACK/CYAN dots. Consequently, overlapping and abutting of dots can be prevented.

An example of using light-color inks in addition to four colors (C, M, Y, K) is described below. In case of the four-color printer, all colors are handled as error-diffusion target colors per pixel in order from a color that most affects visual appearance. However, in case of light colors, the light colors are not considered as independent colors, and a deep color and a light color having identical hues are paired and handled as a single error-diffusion target color.

Therefore, a color processing order for the error diffusion becomes the same as a processing order used in the four-color printer. However, whether to eject deep-color inks or light-color inks is determined based on a threshold in the error diffusion process. For example, when "Light MAGENTA" is ejected in a printer formed of "four colors (C, M, Y, K)+two light colors (Light CYAN, Light MAGENTA)", similarly to the four-color printer, the error diffusion process is performed per pixel in order from a color that most affects visual appearance, i.e., in order of color plates for BLACK→CYAN and Light CYAN→MAGENTA and Light MAGENTA→YELLOW.

Regarding "Light MAGENTA" dots to be output, similarly to "MAGENTA" being a deep color having the same hue, whether or not to output a MAGENTA dot is determined by assuming that dots output for BLACK/CYAN are already output for MAGENTA to prevent dots from being output to be overlapped with the BLACK/CYAN dots. Therefore, overlapping and abutting of dots can be prevented. Furthermore, whether a "MAGENTA" dot or a "Light MAGENTA" dot is generated after an error propagation process of the error diffusion process is determined based on a set threshold in the error diffusion.

Figure 19:
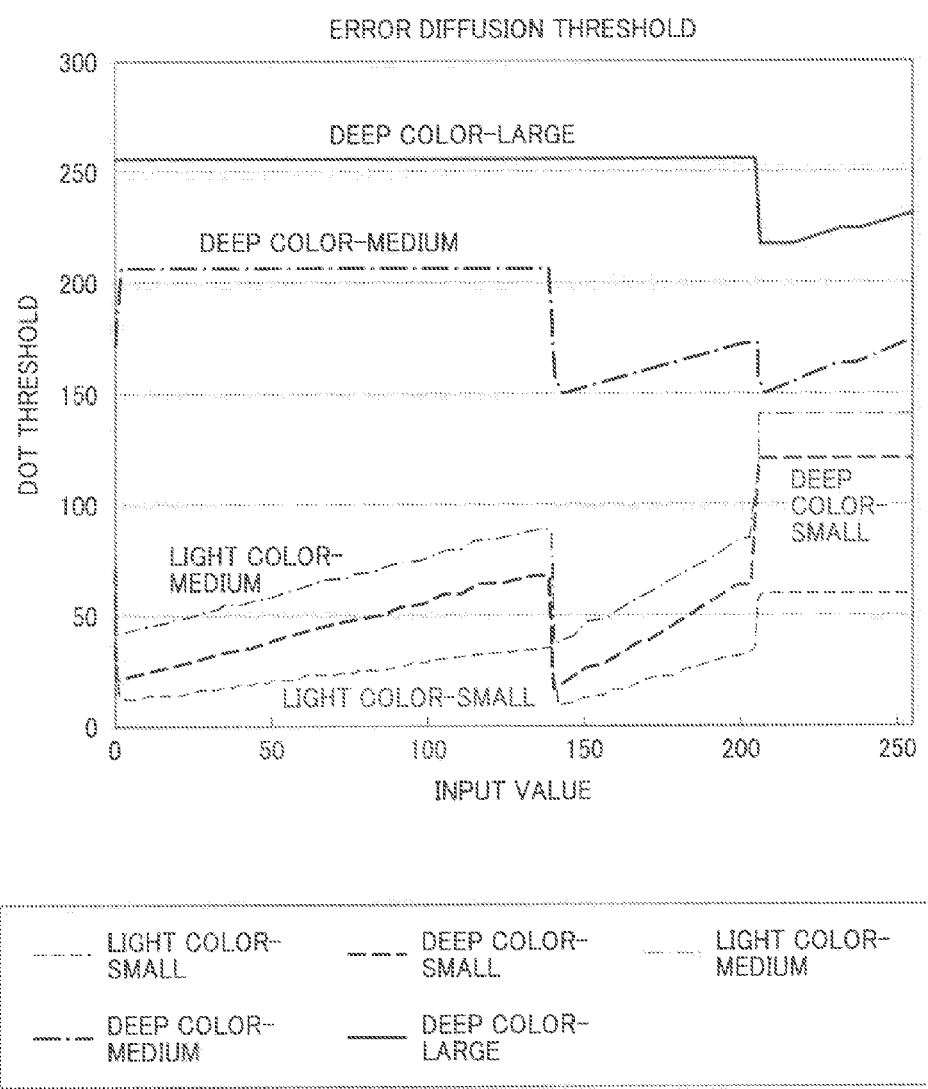
FIG. 19 is a diagram illustrating an example of dot thresholds used in the error diffusion process according to a second embodiment.

FIG. 19 is a diagram illustrating an example of dot thresholds used in the error diffusion process. In the figure, a horizontal axis represents an input value and a vertical axis represents a dot threshold so as to represent dot thresholds for a deep-color large dot, a deep-color medium dot, a deep-color small dot, a light-color medium dot, and a light-color small dot. The dot thresholds are increased such that the deep-color large dot > the deep-color medium dot > the light-color medium dot > the deep-color small dot > the light-color small.

Next, an example is described in which special colors (e.g., RED, GREEN, BLUE) and light colors of the special colors (e.g., Light RED, Light GREEN, Light BLUE) are used in addition to CMYK four colors.

When the special colors (RED, GREEN, BLUE) are used in addition to the CMYK four colors, and assuming that an order of color to be subjected to the error diffusion process is BLACK→BLUE→RED→CYAN→MAGENTA→GREEN→YELLOW (an order other than this order may be applicable because the order varies depending on ink components that differ between a dye ink and a pigment ink for example) and if processing is performed for "RED" for example, whether or not to output a RED dot is determined by assuming that dots output for BLACK/BLUE are already output for RED to prevent dots from being output to be overlapped with the BLACK/BLUE dots. Consequently, overlapping and abutting of dots can be prevented.

Furthermore, when the light colors of the special colors are used, similarly to the above-mentioned example in which the CMYK four colors and the light colors (Light CYAN and Light MAGENTA) are used, "Light RED" being a light color of "RED" is subjected to the error diffusion process in the same order as "RED", and whether "RED" being a deep color or "Light RED" being a light color is output is determined based on a dot threshold in the error diffusion process.

In the error diffusion process performed by the halftone processing unit 135 according to the second embodiment, similarly to the first embodiment, three-staged processes, i.e., the other-plate error acquiring process, the own-plate error acquiring process, and the dot-type determining process are performed per pixel and color (a deep color and a light color having identical hues and different brightness are handled as an identical color). Therefore, only different points will be explained below.

Figure 20:
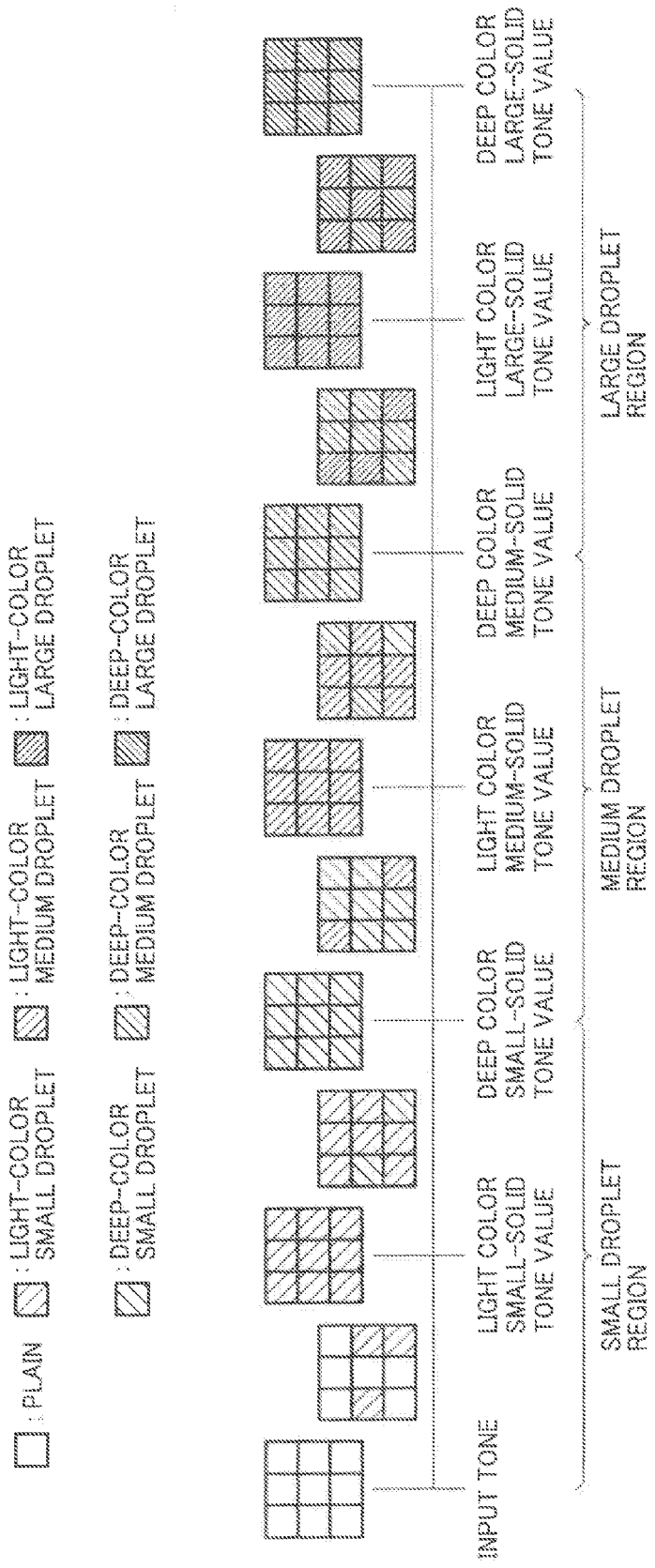
FIG. 20 is a diagram for explaining droplets to be avoided and droplets not necessarily to be avoided when light color is used.

With reference to FIGS. 14A and 20, droplets to be avoided and droplets not necessarily to be avoided when the light color is used will be described. In FIGS. 14A and 20, the droplets to be avoided are (1) small droplets in a light-color small-droplet region, (2) small droplets in a deep-color small-droplet region, (3) medium droplets in a light-color medium-droplet region, (4) medium droplets in a deep-color medium-droplet region, and (5) large droplets in a deep-color large-droplet region. On the other hand, the droplets not necessarily to be avoided are (1) light-color small droplets at a light-color small-solid tone value, (2) light-color small droplets in the deep-color small-droplet region, (3) deep-color small droplets at a deep-color small-solid tone value, (4) deep-color small droplets in the light-color medium-droplet region, (5) deep-color small droplets at a light-color medium-solid tone value, (6) light-color medium droplets in the deep-color medium-droplet region, (7) light-color medium droplets at a deep-color medium-solid tone value, (8) deep-color medium droplets in the deep-color large-droplet region, and (9) deep-color large droplets at a deep-color large-solid tone value.

In the own-plate error acquiring process, errors accumulated before the pixel of interest are acquired by a matrix. This process can be performed similarly to a conventional process. At this state, to prevent redundant acquisition of errors, it is possible not to acquire an own-plate error at a pixel position where an error has been acquired through the other-plate error acquiring process.

In the dot-type determining process, a tone value (final corrected value (in consideration of other color) obtained by adding an other-color error and an own-color error to an input tone value of the pixel of interest is compared with a dot threshold (quantization threshold) determined depending on the input tone value, whereby a dot type for the pixel of interest is determined (the dot type may be "plain", "small droplet", "medium droplet", and "large droplet" for quaternary output). Regarding the dot threshold, a threshold determined based on technologies disclosed in Japanese Patent Application Laid-open No. 2000-270210 and Japanese Patent No. 3732470 for example can be used; therefore, detailed explanation will be omitted. When a dot is to be output after the dot type is determined, a difference between the tone value (own-plate corrected value), which is obtained by adding the own-color error to the input tone value of the pixel of interest, and the dot threshold is accumulated as an error at a position of the pixel of interest (error=own-plate corrected value−dot threshold), and the error is used for successive pixels. When a dot is not to be output, the own-plate corrected value is accumulated as the error (error=own-plate corrected value).

Figure 21:
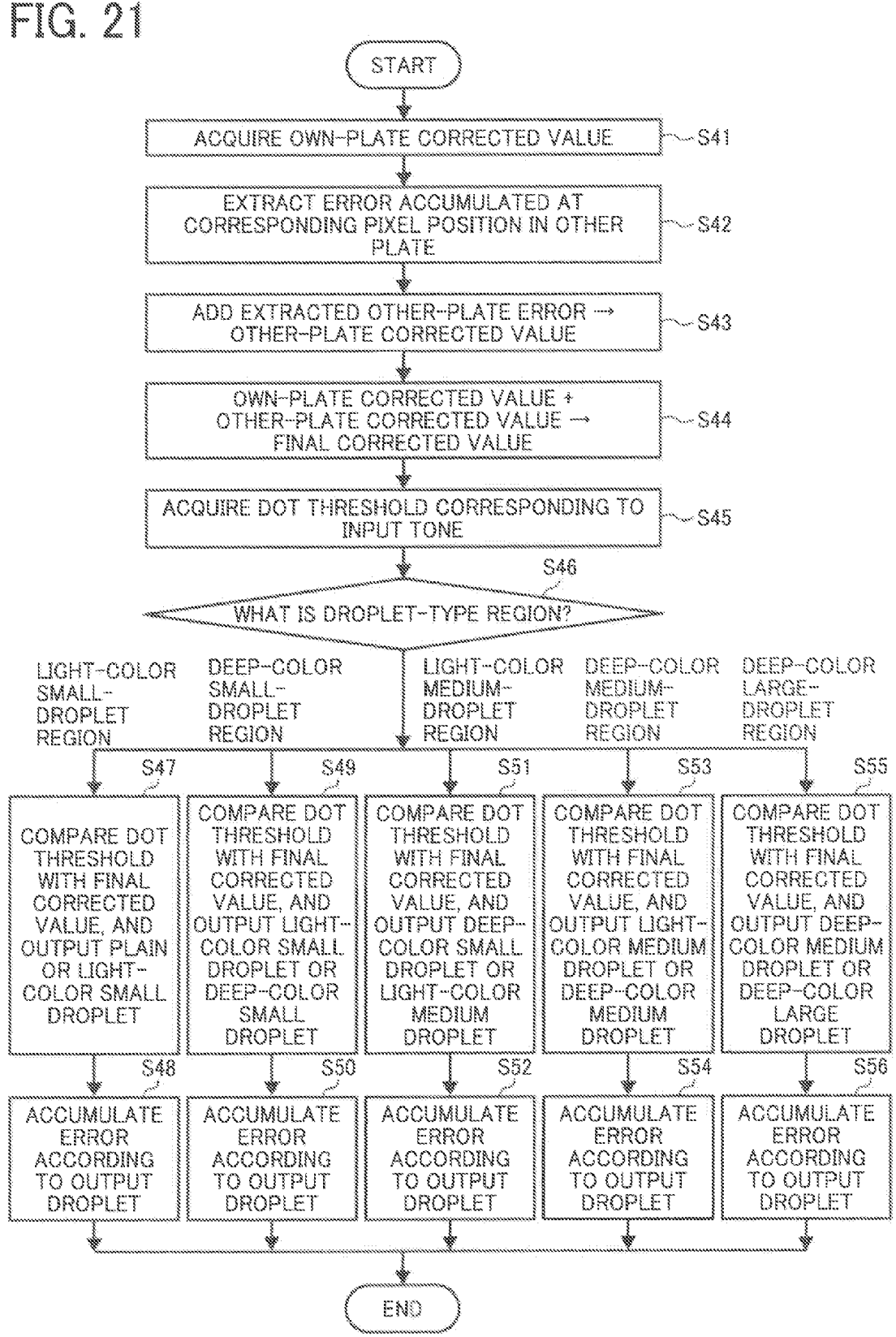
FIG. 21 is a flowchart for explaining an error diffusion process according to a first example, which is performed by a halftone processing unit according to the second embodiment.

FIG. 21 is a flowchart for explaining the error diffusion process of a first example, which is performed by the halftone processing unit 135 according to the second embodiment. The error diffusion process according to the first example is configured to refer to all errors in the other plate. In the figure, an own-plate corrected value is acquired (Step S41). Then, an error accumulated at a corresponding pixel position in the other plate is extracted (Step S42), and an other-plate corrected value is calculated by the addition of the extracted error (Step S43). A final corrected value is then calculated by adding the other-plate corrected value to the own-plate corrected value (Step S44). Subsequently, a dot threshold corresponding to an input tone is acquired (Step S45). Then, it is determined whether a droplet-type region is a light-color small-droplet region, a deep-color small-droplet region, a light-color medium-droplet region, a deep-color medium-droplet region, or a deep-color large-droplet region (Step S46).

At Step S46, when it is determined to be the light-color small-droplet region, the dot threshold and the final corrected value are compared with each other. When the final corrected value < the dot threshold, plain is output, and, when the final corrected value ≧ the dot threshold, a light-color small droplet is output (Step S47). Then, an error is accumulated according to the output droplet (Step S48).

Furthermore, at Step S46, when it is determined to be the deep-color small-droplet region, the dot threshold and the final corrected value are compared with each other. When the final corrected value < the dot threshold, a light-color small droplet is output, and, when the final corrected value ≧ the dot threshold, a deep-color small droplet is output (Step S49). Then, an error is accumulated according to the output droplet (Step S50).

Moreover, at Step S46, when it is determined to be the light-color medium-droplet region, the dot threshold and the final corrected value are compared with each other. When the final corrected value < the dot threshold, a deep-color small droplet is output, and, when the final corrected value ≧ the dot threshold, a light-color medium droplet is output (Step S51). Then, an error is accumulated according to the output droplet (Step S52).

Furthermore, at Step S46, when it is determined to be the deep-color medium-droplet region, the dot threshold and the final corrected value are compared with each other. When the final corrected value < the dot threshold, a light-color medium droplet is output, and, when the final corrected value ≧ the dot threshold, a deep-color medium droplet is output (Step S53). Then, an error is accumulated according to the output droplet (Step S54).

Moreover, at Step S46, when it is determined to be the deep-color large-droplet region, the dot threshold and the final corrected value are compared with each other. When the final corrected value < the dot threshold, a deep-color medium droplet is output, and, when the final corrected value ≧ the dot threshold, a deep-color large droplet is output (Step S55). Then, an error is accumulated according to the output droplet (Step S56).

Figure 22:
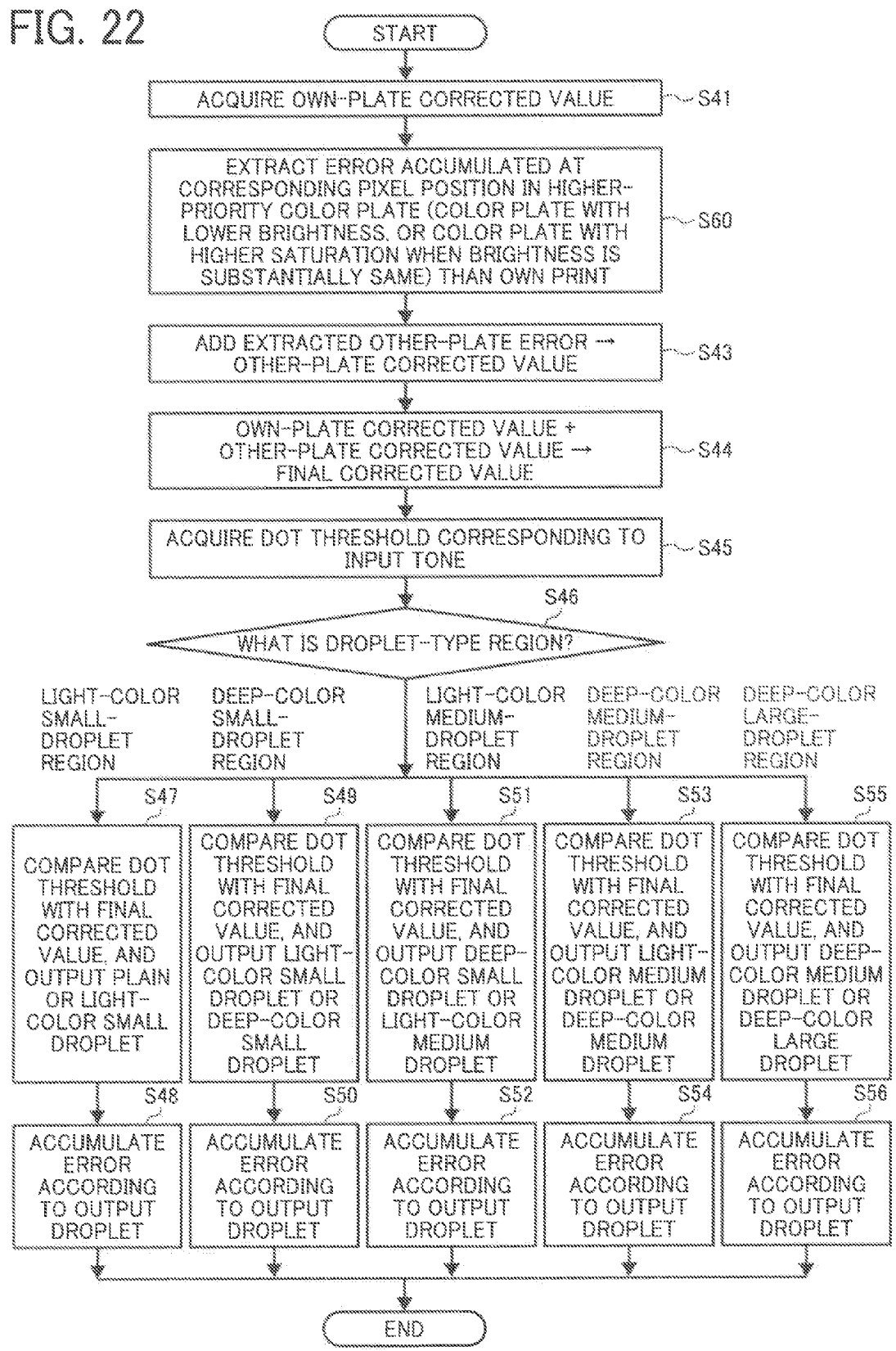
FIG. 22 is a flowchart for explaining an error diffusion process according to a second example, which is performed by the halftone processing unit according to the second embodiment.

FIG. 22 is a flowchart for explaining an error diffusion process according to a second example, which is performed by the halftone processing unit 135 according to the second embodiment. In the first example, all errors in the other plate are referred to. However, in the second example, only errors in a higher-priority color plate than the own plate are referred to so as to preferentially arrange color that largely affects visual appearance. In FIG. 22, Steps at which processes identical to those of FIG. 21 are performed are denoted by identical Step numbers. Accordingly, explanation of the common Steps will be omitted and only a different Step will be described below.

In FIG. 22, at Step S60, an error accumulated at a corresponding pixel position in the higher-priority color plate than the own plate (i.e., in a color plate with lower brightness, or when the brightness is substantially the same, in a color plate with higher saturation) is extracted. Then, an other-plate corrected value is calculated by the addition of the extracted error.

Figure 23B:
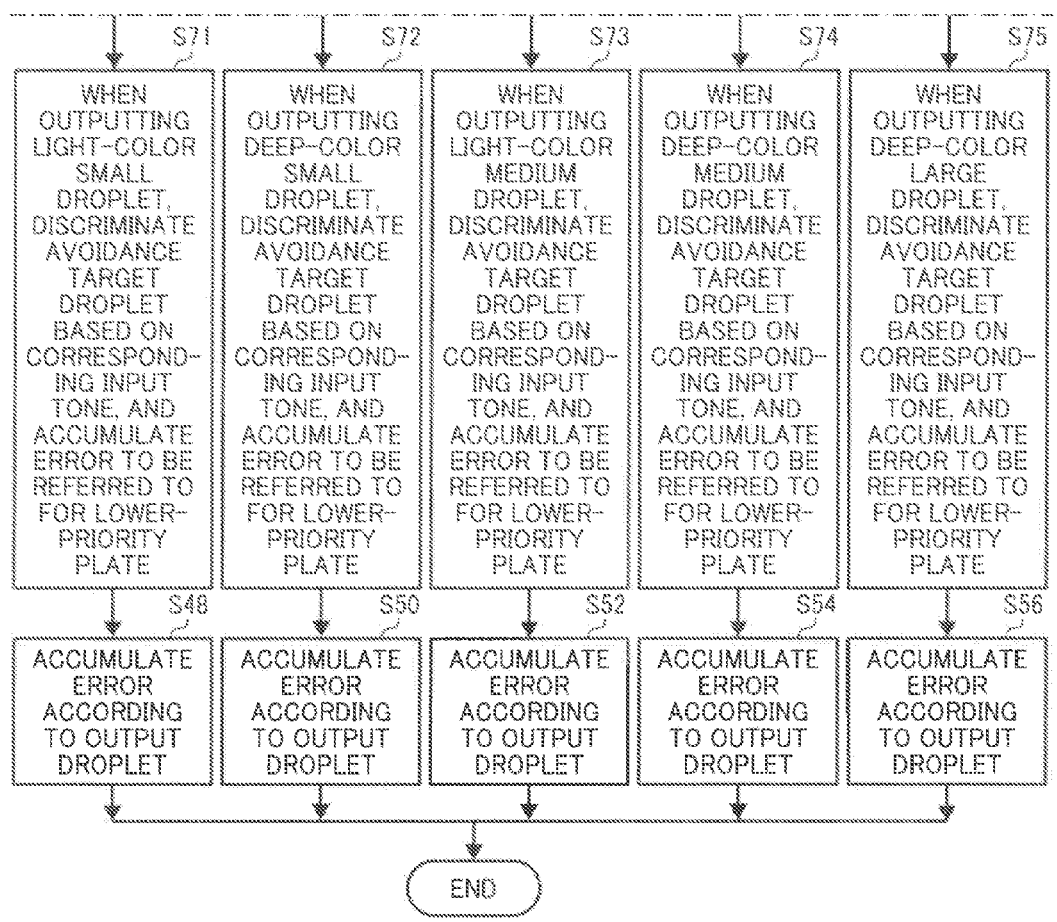

FIGS. 23A and 23B are detailed flowcharts of the FIG. 23 flowchart for explaining an error diffusion process according to a third example of the second embodiment. In the second example, all errors in the higher-priority color plate are referred to. However, in the third example, other-plate errors are accumulated only for avoidance target droplets (see FIGS. 14A and 14B) so that the avoidance target droplets in the higher-priority color plate can assuredly be avoided in a lower-priority color plate. In FIG. 23A, Steps at which processes identical to those of FIG. 22 are performed will be denoted by identical Step numbers. Accordingly, explanation of the common Steps will be omitted and only different Steps will be described.

In FIG. 23B, at Steps S71 to S75, when a light-color small droplet, a deep-color small droplet, a light-color medium droplet, a deep-color medium droplet, or a deep-color large droplet is output, an avoidance target droplet is determined based on corresponding input tone, and an error to be referred to in a lower-priority color plate is accumulated.

As described above, according to the second embodiment, in the image forming apparatus that quantizes the M-value image data into N-value for each of a plurality of color components having different hues (e.g., C (cyan), M (magenta), Y (yellow), Bk (black), one or more color components (e.g., M) among the plurality of color components having the different hues contain a plurality of types of components having identical hues and different brightness (e.g., deep M and light M), and the halftone processing unit 135 compares the final corrected value with the quantization threshold to thereby output N-value image data for one of the plurality of types of components (e.g., deep M and light M) of the process-target color component (e.g., M). Therefore, even when color materials having identical hues and different brightness are additionally provided, whether or not to output a dot is determined in consideration of both a dot in the high-priority color plate and a dot in the own-plate. Consequently, abutting and overlapping of dots in secondary or later color.

(Computer Program)

The image processing apparatus of the present invention can be applied to a system constructed of a plurality of devices (e.g., a host computer, interface devices, scanners, printers, and the like), or can be applied to an apparatus constructed of a single device (e.g., a host computer).

The object of the present invention can be achieved by providing a system and an apparatus with a recording medium recorded thereon program codes for software for implementing the above-mentioned functions of the image processing apparatus, and causing computer (or a CPU, an MPU, and a DSP) of the system and the apparatus to execute the program codes stored in the recording medium. In this case, the program codes themselves loaded from the recording medium implements the above-mentioned functions of the image processing apparatus, and the program codes and the recording medium recorded thereon the computer program of the program codes are constituent elements of the present invention. The recording medium for providing the program code may be an optical recording medium, a magnetic recording medium, a magneto-optical recording medium, and a semiconductor recording medium. Examples of these recording medium include an FD, a hard disk, an optical disk, a magneto-optical disk, a CD-ROM, a CD-R, a magnetic tape, nonvolatile memory, and a ROM.

Furthermore, it goes without saying that the result of executing the program codes read by the computer includes not only a case in which the above-mentioned functions of the image processing apparatus are implemented but also a case in which an OS (operating system) or the like running on the computer performs a part or whole of an actual process based on instructions of the program codes to implement the above-mentioned functions of the image processing apparatus by the process.

Moreover, it goes without saying that there is also included a case in which the program codes read from the recording medium are written to a memory provided in a function extension board inserted into the computer or in a function extension unit connected to the computer, and then a CPU or the like provided in the function extension board or in the function extension unit performs a part or whole of an actual process based on instructions of the program codes to implement the above-mentioned functions of the image processing apparatus by the process.

In the embodiments described above, an example is used in which the present invention is applied to the inkjet recording apparatus. However, the present invention can be applied to printers, facsimile machines, copiers, printer/fax/copier multifunction peripherals, and the like. Furthermore, the present invention can also be applied to image forming apparatuses using recording liquids other than inks, data processing apparatuses that can provide print data to the image forming apparatuses, and printer drives provided in the data processing apparatuses.

According to the present invention, in the image processing apparatus that quantizes M-value image data containing at least two types of color components into an N-value for each color component (M>N>1), there is provided a corrected-value calculating unit that calculates the final corrected value by adding an error diffused from a neighboring quantized pixel value corresponding to a processing-target color component and an error diffused from a quantized pixel value corresponding to a color component different from the processing-target color component to a pixel value corresponding to the processing-target color component of a pixel of interest in the M-value image data; the quantization-threshold setting unit that sets the quantization threshold based on a pixel value corresponding to the processing-target color component of the pixel of interest; the quantizing unit that compares the final corrected value with the quantization threshold and outputs N-value image data of the processing-target color component; and the error diffusion unit that calculates and accumulates an error caused by generation of the N-value image data. Therefore, it is possible to optimize distribution of dots arranged in the whole color plate of the M-value image data containing at least two types of color components, resulting in preventing color overlay in each color plate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that performs an error diffusion process on M-value image data by using a predetermined error weight matrix to quantize the M-value image data into N-value image data (M>N>1) for each predetermined color component, the image processing apparatus comprising:
  a corrected-value calculating unit that calculates a corrected value by adding a first value and a second value to a pixel value corresponding to a processing-target color component of a pixel of interest of the M-value image data,
    the first value being obtained by multiplying an error for each quantized pixel of the processing-target color component by the error weight matrix, and
    the second value being obtained by multiplying an error for each quantized pixel of a different color component from the processing-target color component by the error weight matrix;
  a quantizing unit that
    compares the corrected value with a quantization threshold corresponding to the N-value image data, and
    outputs N-value image data of the processing-target color component; and
  an error diffusion unit that calculates, as an error at the pixel of interest, a value by subtracting a quantization threshold corresponding to the output N-value image data from a value which is obtained by adding the first value to the pixel value corresponding to the processing-target color component of the pixel of interest.

2. The image processing apparatus according to claim 1, wherein
  the predetermined color component includes a plurality of color components having different hues.

3. The image processing apparatus according to claim 2, wherein
  one or more color components among the plurality of color components having the different hues contain a plurality of types of components having identical hues and different brightness, and
  when the processing-target color component contains a plurality of types of components having identical hues and different brightness, the quantizing unit compares the corrected value with the quantization threshold and outputs N-value image data of one of the plurality of types of components contained in the processing-target color component.

4. The image processing apparatus according to claim 1, wherein
  the different color component has brightness lower than that of the processing-target color component.

5. The image processing apparatus according to claim 1, wherein
  the different color component corresponds to a color that largely influences granularity compared to the processing-target color component.

6. The image processing apparatus according to claim 5, wherein
  a degree of influence on the granularity is evaluated in such a manner that
    variable spatial-frequency components for a brightness component and chromaticity components are calculated based on brightness $L^*$ and chromaticity $a^*$ and $b^*$ of each color material,
    the calculated spatial-frequency components are corrected based on spatial frequency characteristics of a visual system,
    the corrected spatial-frequency components are integrated to obtain evaluation values of the brightness component and the chromaticity components,
    the evaluation values of the brightness component are corrected in brightness feature by multiplying a weighting function that monotonically increases as average brightness increases, and
    evaluation is performed by using the corrected evaluation values.

7. The image processing apparatus according to claim 1, wherein
  an error from the different color component is adjusted by using a coefficient corresponding to the brightness.

8. The image processing apparatus according to claim 1, wherein
  an error from the different color component is diffused only from a pixel for which a dot is generated, from among quantized pixels.

9. The image processing apparatus according to claim 1, wherein
  an error from the different color component is diffused by using a predetermined filter.

10. The image processing apparatus according to claim 1, wherein
  an error from the different color component is diffused based on multi-valued image data of the different color component.

11. The image processing apparatus according to claim 1, wherein
  an error from the different color component is diffused based on both multi-valued image data of the pixel of interest and multi-valued image data of the different color component.

12. An image processing method for an image processing apparatus to perform an error diffusion process on M-value image data by using a predetermined error weight matrix to quantize the M-value image data into N-value image data (M>N>1) for each predetermined color component, the image processing method comprising:
  calculating a corrected value by adding a first value and a second value to a pixel value corresponding to a processing-target color component of a pixel of interest of the M-value image data,
    the first value being obtained by multiplying an error for each quantized pixel of the processing-target color component by the error weight matrix, and
    the second value being obtained by multiplying an error for each quantized pixel of a different color component from the processing-target color component by the error weight matrix;
  quantizing the processing-target color component by
    comparing the corrected value with a quantization threshold corresponding to the N-value image data, and
    outputting N-value image data of the processing-target color component; and
  error-diffusing by calculating, as an error at the pixel of interest, a value by subtracting a quantization threshold corresponding to the output N-value image data from a value which is obtained by adding the first value to the pixel value corresponding to the processing-target color component of the pixel of interest.

13. A computer program product comprising a computer usable medium having computer readable program codes embodied in the medium for an image processing apparatus to perform an error diffusion process on M-value image data by using a predetermined error weight matrix to quantize the M-value image data into N-value image data (M>N>1) for each predetermined color component, the program codes when executed causing a computer to execute:

calculating a corrected value by adding a first value and a second value to a pixel value corresponding to a processing-target color component of a pixel of interest of the M-value image data, the first value being obtained by multiplying an error for each quantized pixel of the processing-target color component in the error weight matrix by a value of each pixel in the error weight matrix, and the second value being obtained by multiplying an error for each quantized pixel of a different color component from the processing-target color component in the error weight matrix by a value of each pixel in the weight matrix;

comparing the corrected value with a quantization threshold corresponding to the N-value image data to thereby output N-value image data of the processing-target color component; and calculating, as an error at a pixel of interest, a value by subtracting a quantization threshold corresponding to the output N-value image data from a value which is obtained by adding a pixel value of the processing-target color component and the error weight matrix to a pixel value corresponding to the processing-target color component of the pixel of interest.

* * * * *